US008634416B2

(12) United States Patent
Takashimizu et al.

(10) Patent No.: US 8,634,416 B2
(45) Date of Patent: *Jan. 21, 2014

(54) RECEIVING APPARATUS FOR DIGITAL BROADCASTING SIGNAL AND RECEIVING/RECORDING/REPRODUCING APPARATUS THEREOF

(75) Inventors: Satoru Takashimizu, Yokohama (JP); Yuji Yamamoto, Yokohama (JP); Kenji Katsumata, Yokohama (JP); Takumi Okamura, Yokohama (JP); Takuya Matsumoto, Yokohama (JP); Shuko Sei, Yokohama (JP); Yuji Hatanaka, Yokohama (JP)

(73) Assignee: Hitachi Consumer Electronics, Co., Ltd., Tokyo (JP)

( * ) Notice: Subject to any disclaimer, the term of this patent is extended or adjusted under 35 U.S.C. 154(b) by 309 days.

This patent is subject to a terminal disclaimer.

(21) Appl. No.: 13/114,145

(22) Filed: May 24, 2011

(65) Prior Publication Data
US 2011/0221968 A1 Sep. 15, 2011

Related U.S. Application Data

(63) Continuation of application No. 11/892,040, filed on Aug. 20, 2007, now Pat. No. 7,974,316, which is a continuation of application No. 10/435,248, filed on May 12, 2003, now Pat. No. 7,283,570, which is a continuation of application No. 09/851,196, filed on May 9, 2001, now Pat. No. 6,813,283, which is a continuation of application No. 08/986,074, filed on Dec. 5, 1997, now Pat. No. 6,185,228.

(30) Foreign Application Priority Data

Dec. 17, 1996 (JP) ..................................... 08-336808
Jul. 31, 1997 (JP) ..................................... 09-205769

(51) Int. Cl.
| H04L 12/28 | (2006.01) |
| H04J 3/00 | (2006.01) |
| H04J 3/04 | (2006.01) |
| H04N 5/93 | (2006.01) |
| H04N 5/917 | (2006.01) |
| H04N 21/434 | (2011.01) |
| H04N 21/433 | (2011.01) |
| H04N 21/236 | (2011.01) |
| H04N 5/76 | (2006.01) |

(52) U.S. Cl.
CPC ....... *H04N 21/4344* (2013.01); *H04N 21/4343* (2013.01); *H04N 21/4341* (2013.01); *H04N 21/434* (2013.01); *H04N 21/433* (2013.01); *H04N 21/4333* (2013.01); *H04N 21/4334* (2013.01); *H04N 21/23608* (2013.01); *H04N 5/76* (2013.01)
USPC ........... 370/389; 370/464; 370/498; 370/535; 386/355; 386/356; 386/357; 386/353

(58) Field of Classification Search
CPC ....... H04H 60/27; H04N 5/44; H04N 5/4401; H04N 5/76; H04N 9/80; H04N 21/433; H04N 21/4331; H04N 21/4332; H04N 21/4333; H04N 21/4334; H04N 21/434; H04N 21/4341; H04N 21/4342; H04N 21/4343; H04N 21/4344
USPC ................... 370/464, 498, 535; 348/725, 726
See application file for complete search history.

(56) References Cited

U.S. PATENT DOCUMENTS 4,432,087 A * 2/1984 Hubbard ........................ 370/267
5,056,109 A 10/1991 Gilhousen et al. ............. 370/342
(Continued)

FOREIGN PATENT DOCUMENTS

EP 0735776 10/1996
EP 0735776 B1 10/1996
(Continued)

OTHER PUBLICATIONS

O. Brungum "Transmultiplexing, Transcontrol and Transscrambling of MPEG-2/DVB Signal", International Broadcasting Convention, London, Sep. 12, 1996, pp. 288-293.

(Continued)

*Primary Examiner* — Ayaz Sheikh
*Assistant Examiner* — Tarell Hampton
(74) *Attorney, Agent, or Firm* — Brundidge & Stanger, P.C.

(57) ABSTRACT

In a digital broadcasting signal receiving/recording/reproducing apparatus, a recorded program can be immediately reproduced without performing complicated operations. Only a desired program and information related to the desired program are separated to be extracted from the digital broadcasting signal. Then, the separated/extracted broadcasting signal is supplied to a recording/reproducing apparatus. In the recording/reproducing apparatus, the supplied broadcasting signal is recorded, and the recorded program can be immediately reproduced without complicated manipulating operations during the signal reproducing operation.

6 Claims, 21 Drawing Sheets

(56) References Cited

U.S. PATENT DOCUMENTS

| | | | |
|---|---|---|---|
| 5,359,601 A | 10/1994 | Wasilewski et al. | 370/73 |
| 5,420,866 A | 5/1995 | Wasilewski | 370/110.1 |
| 5,515,378 A | 5/1996 | Roy et al. | 370/334 |
| 5,539,749 A | 7/1996 | Eul | 370/331 |
| 5,566,174 A | 10/1996 | Sato et al. | |
| 5,600,378 A | 2/1997 | Wasilewski | 348/468 |
| 5,619,337 A | 4/1997 | Naimpally | |
| 5,661,845 A | 8/1997 | Sugiyama | 386/68 |
| 5,742,352 A | 4/1998 | Tsukagoshi | 348/468 |
| 5,742,361 A * | 4/1998 | Nakase et al. | 375/240.26 |
| 5,777,997 A | 7/1998 | Kahn et al. | 370/535 |
| 5,790,745 A | 8/1998 | Sugiyama et al. | 348/405 |
| 5,815,634 A | 9/1998 | Daum et al. | 386/96 |
| 5,835,593 A | 11/1998 | Tsutsui | 380/23 |
| 5,844,636 A | 12/1998 | Joseph et al. | 348/845 |
| 5,864,358 A | 1/1999 | Suzuki et al. | 725/142 |
| 5,899,578 A | 5/1999 | Yanagihara et al. | |
| 5,917,830 A | 6/1999 | Chen et al. | 370/487 |
| 5,923,812 A * | 7/1999 | Sakazaki et al. | 386/326 |
| 5,949,476 A | 9/1999 | Pocock et al. | 348/24 |
| 5,973,748 A | 10/1999 | Horiguchi et al. | 348/554 |
| 5,999,689 A | 12/1999 | Igguiden | 348/460 |
| 6,163,644 A | 12/2000 | Owashi et al. | |
| 6,185,228 B1 | 2/2001 | Takashimizu et al. | 370/535 |
| 6,256,390 B1 | 7/2001 | Okuyama et al. | 380/201 |
| 6,321,025 B1 * | 11/2001 | Owashi et al. | 386/291 |
| 6,438,171 B1 | 8/2002 | Cartwright et al. | 375/240.26 |
| 6,813,283 B2 | 11/2004 | Takashimizu et al. | 370/535 |
| 6,826,202 B2 | 11/2004 | Takashimizu et al. | |
| 7,075,945 B2 | 7/2006 | Arsenault et al. | 370/477 |
| 7,123,631 B2 | 10/2006 | Takashimizu et al. | |
| 7,123,931 B2 | 10/2006 | Chen et al. | 455/522 |
| 7,283,570 B2 | 10/2007 | Takashimizu et al. | |
| 2007/0297461 A1 | 12/2007 | Takashimizu et al. | |

FOREIGN PATENT DOCUMENTS

| | | |
|---|---|---|
| EP | 0740478 | 10/1996 |
| JP | 07327199 | 12/1995 |
| JP | 856350 | 2/1996 |
| JP | 898164 | 4/1996 |
| JP | 8140055 | 5/1996 |
| JP | 8205085 | 8/1996 |
| JP | 0827151 | 10/1996 |
| JP | 08297919 | 11/1996 |
| JP | 09186968 | 7/1997 |
| WO | 9746008 | 12/1997 |

OTHER PUBLICATIONS

Digital Broadcasting Systems for Television, Sound and Data Services; Specification for Service Information (SI) in Digital Video Broadcasting (DVB) System, European Telecommunications Standards Institute, Feb. 1997, pp. 1-70.

O. W. Bungum, "Transmultiplexing, Transcontrol and Transscrambling of MPEG-2/DVB Signal", International Broadcasting Convention, London, Sep. 12, 1996, pp. 288-293.

* cited by examiner

PACKET STRUCTURE

METHOD OF PACKET MULTIPLEXING

HEADER STRUCTURE

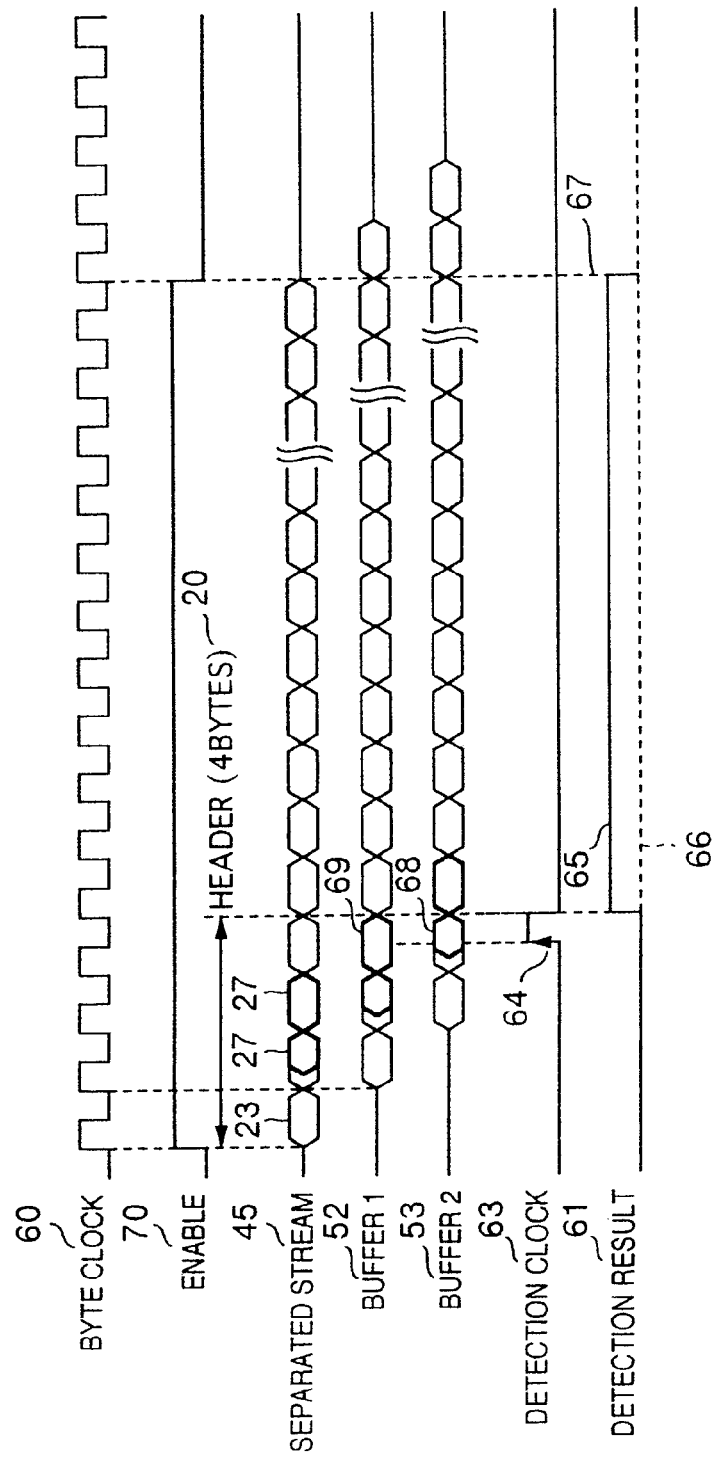

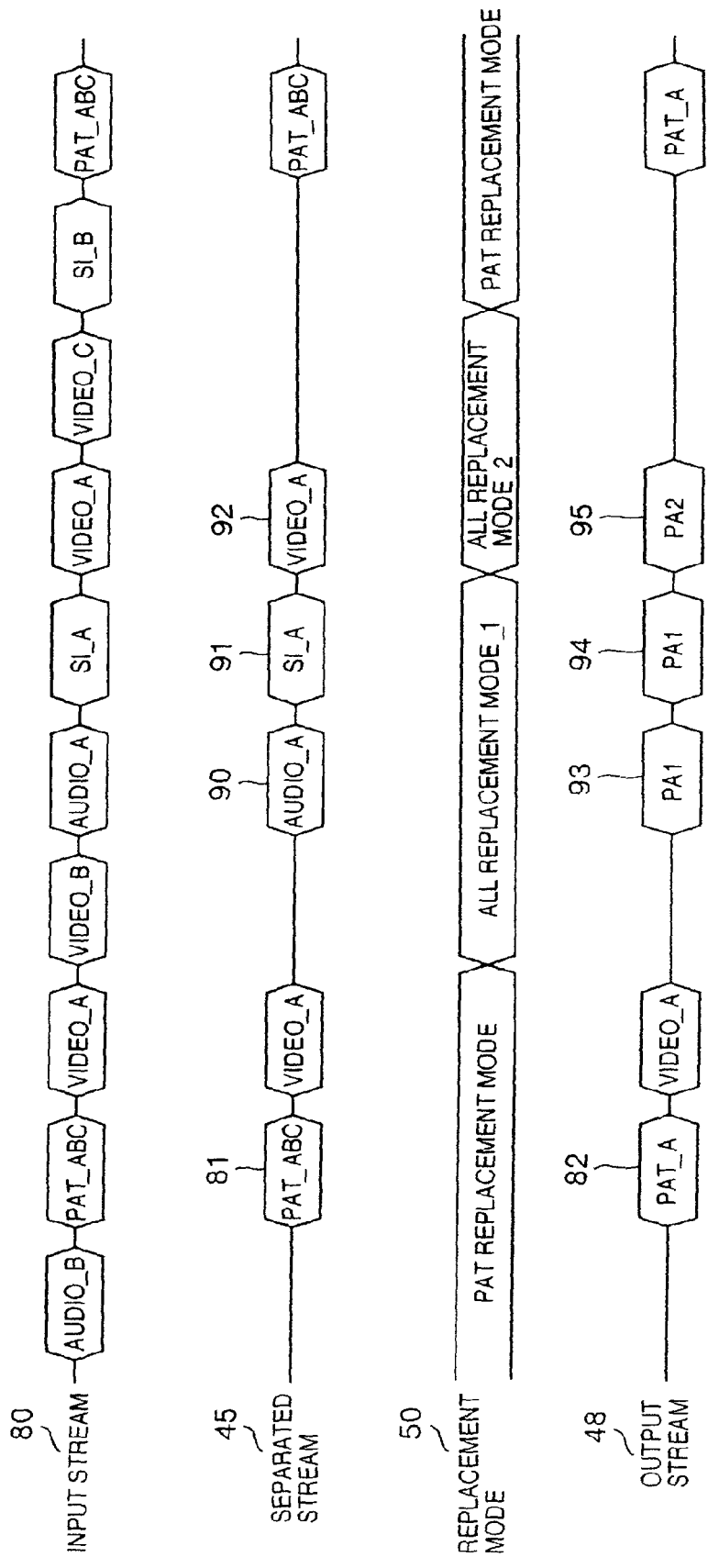

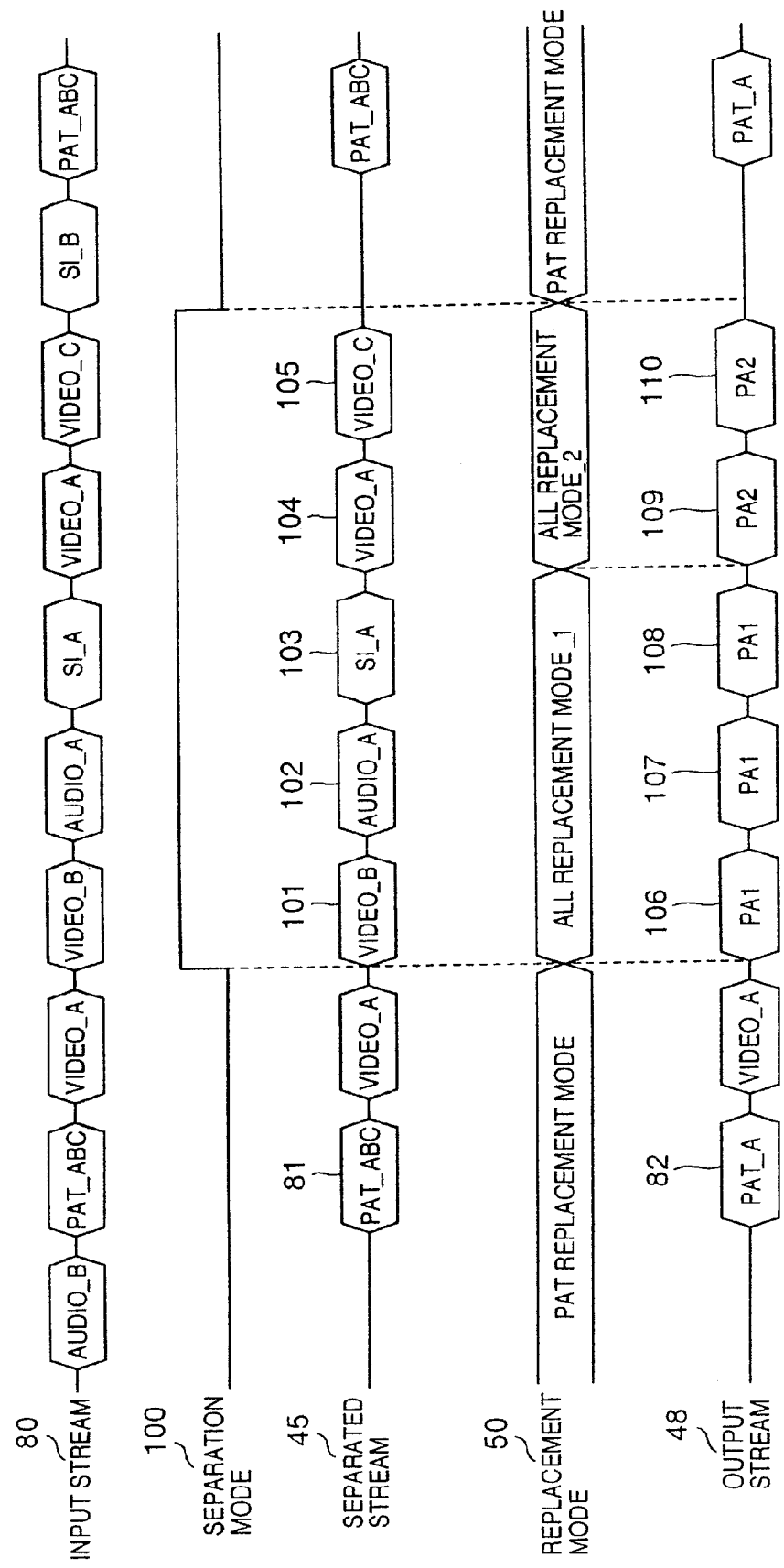

RECEIVING APPARATUS FOR DIGITAL BROADCASTING SIGNAL AND RECEIVING/RECORDING/REPRODUCING APPARATUS THEREOF

The present application is a continuation of application Ser. No. 11/892,040, filed Aug. 20, 2007, now U.S. Pat. No. 7,974,316; which is a continuation of application Ser. No. 10/435,248, filed May 12; 2003, now U.S. Pat. No. 7,283,570; which is a continuation of application Ser. No. 09/851,196, filed May 9, 2001, now U.S. Pat. No. 6,813,283; which is a continuation of application Ser. No. 08/986,074, filed Dec. 5, 1997, now U.S. Pat. No. 6,185,228, the contents of which are incorporated herein by reference.

BACKGROUND OF THE INVENTION

The present invention generally relates to an apparatus for receiving a digital broadcasting signal, and an apparatus for receiving/recording/reproducing the digital broadcasting signal. More specifically, the present invention is directed to a digital broadcasting signal receiving apparatus, and a receiving/recording/reproducing apparatus suitable for directly recording/reproducing such a digital broadcasting signal.

The conventional digital signal receiving/recording/reproducing technique is described in, for instance, JP-A-8-98164, namely the receiving/recording/reproducing apparatus receives the digital signal by which a plurality of information is multiplexed and the multiplexed information is transmitted, and then records this digital signal. The conventional technique describes the receiving means for receiving the digital information signal by which a plurality of information is multiplexed and then the multiplexed information is transmitted, and for selecting desired information; and also the recording means for recording the information received by the receiving means. Also, JP-A-8-56350 discloses such a conventional technique that the desirable program is selected when the digital signal by which a plurality of information is multiplexed and then the multiplexed information is transmitted is received to represent the programs. In the conventional technique, such a program seeking apparatus is described. That is, a plurality of programs are converted into packets by adding packet identifiers to the respective programs, and furthermore, the transfer control data indicative of the relationship between these programs and the packet identifiers are converted into the packets. These packets are multiplexed to be transmitted as the multiplexed signals from which the respective programs are seeked.

The above-mentioned conventional technique of JP-A-8-98164 has not described the following idea. That is, when the recorded programs are reproduced, only the information related to a desirable program is separated from the multiplexed information, and then the separated program is reproduced. On the other hand, another conventional technique of JP-A-8-56350 discloses such a seeking means for deriving a desirable signal from the digital multiplexed signal and for representing the derived desirable signal. However, generally speaking, in a conventionally available VTR (Video Tape Recorder) for recording/reproducing an analog signal, when a recorded program is reproduced, the program can be reproduced by merely manipulating a reproducing switch, and without performing any other complex operations. To the contrary, even when the digital information signal processing technique as explained in JP-A-8-98164 would be combined with another conventional technique as explained in JP-A-8-56350, cumbersome operations such as the program seeking operation should be carried out during the program reproducing operation. As a consequence, it is not possible to realize such a program reproducing operation that the desirable recorded program can be immediately reproduced by simply manipulating a single switch.

SUMMARY OF THE INVENTION

An object of the present invention is to provide a digital broadcasting signal receiving apparatus as well as a digital broadcasting signal receiving/recording/reproducing apparatus, capable of immediately reproducing a program recorded in a direct form of a digital signal without executing any cumbersome operations similar to the above-described analog signal recording/reproducing VTR.

To achieve this object, a digital broadcasting signal receiving apparatus, according to an aspect of the present invention, is provided. The digital broadcasting signal receiving apparatus include channel decoder for receiving digital transfer information and for demodulating the received digital transfer information into a bit stream having a predetermined packet structure, the digital transfer information being produced by that a plurality of logical channel signals constituted by video, audio, and data are multiplexed as digital information on a single bit stream having a predetermined packet format and are transferred, first packet separating apparatus for extracting a designated packet from a bit stream outputted from the channel decoding means, a source decoder for decoding a logical channel signal outputted from the first packet separating apparatus to output the decoded logical channel as a television signal, second packet separating apparatus for extracting at least a portion of the designated packets from the bit stream outputted from the channel decoder, output apparatus for outputting a bit stream output from the second packet separating apparatus toward a recording/reproducing apparatus, input apparatus for supplying a bit stream derived from the recording/reproducing apparatus to the first packet separating apparatus, and control apparatus for controlling operations of the first packet separating apparatus and the second packet separating apparatus.

BRIEF DESCRIPTION OF THE DRAWINGS

For a more better understanding of the present invention, reference is made of a detailed description to be read in conjunction with the accompanying drawings, in which:

FIG. 20 is a timing chart for indicating operations of the packet replacing circuit shown in FIG. 19;

FIG. 21 is a timing chart for representing conditions a first operation in an all replacement mode; and FIG. 22 is a timing chart for showing a second operation in the all replacement mode.

DETAILED DESCRIPTION OF THE PREFERRED EMBODIMENTS

Figure 1:
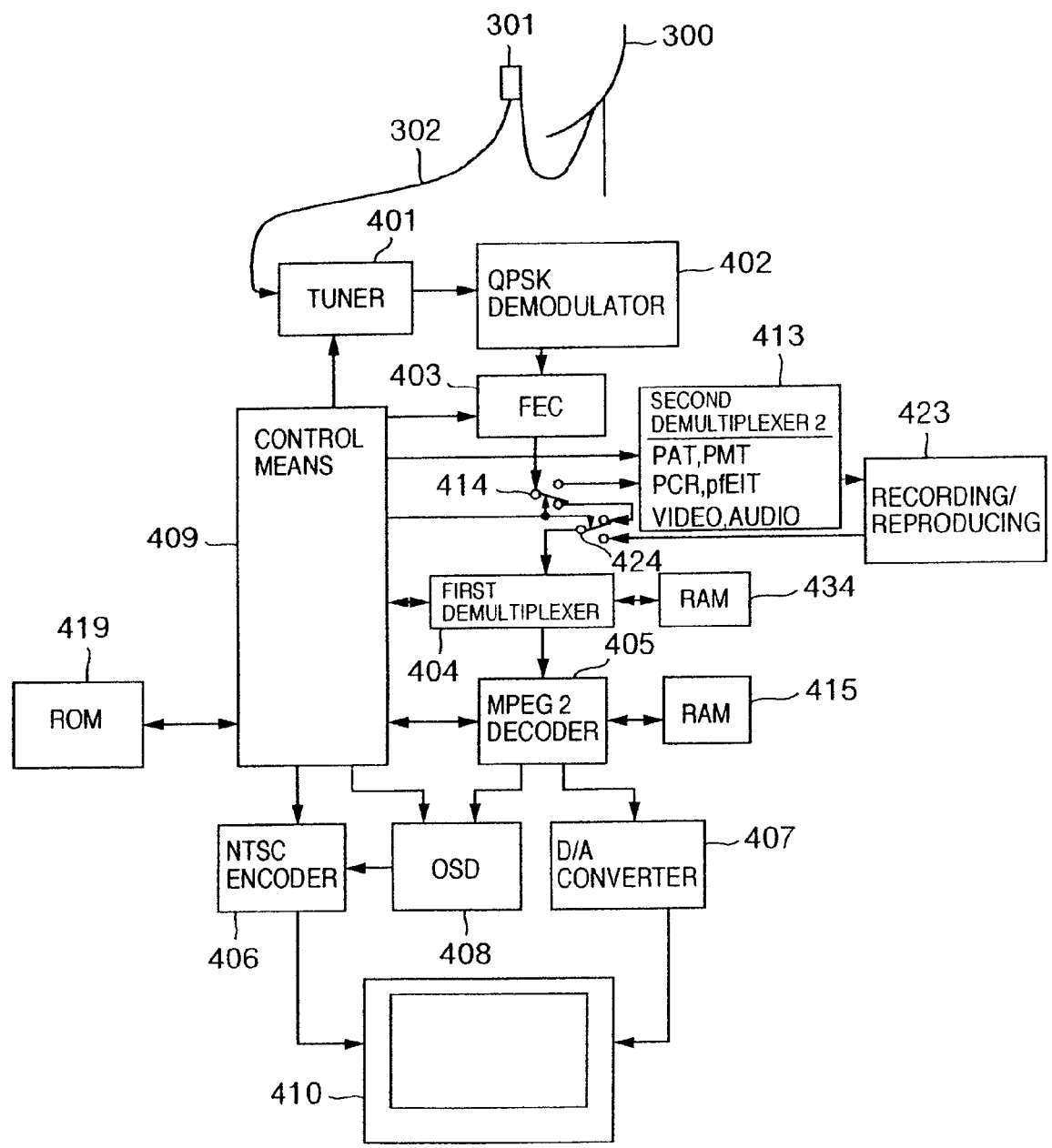
FIG. 1 is a schematic block diagram for representing an arrangement of a digital broadcasting signal receiving/recording/reproducing apparatus according to a first embodiment of the present invention.

FIG. 1 is a schematic block diagram for indicating an arrangement of an apparatus for receiving/recording/reproducing a digital broadcasting signal, according to a first embodiment of the present invention. In the following description, an antenna 300 receives satellite broadcasting which have been digitally modulated in accordance with the Quadrature Phase-Shift Keying (will be simply referred to as a "QPSK" hereinafter). However, the present invention is not limited to the QPSK modulating system, but also to the satellite broadcasting system. Also, in the following description, the Moving Picture Experts Group 2 (will be simply referred to as an "MPEG2" hereinafter) is employed as signal compressing/decompressing system. However, similarly, the signal compressing/decompressing system used in the embodiments of the present invention is not employed as the limited purpose.

In FIG. 1, reference numeral 300 shows an antenna, reference numeral 301 indicates a converter for converting the received radio wave into a tuner input signal, and reference numeral 302 is a cable. Also, reference numeral 401 indicates a tuner, reference numeral 402 indicates a QPSK demodulator, reference numeral 403 indicates a Forward Error Correction (will, be referred to as an "FEC" hereinafter) for correcting an error of a signal caused by transmitting the signal, reference numerals 414 and 424 indicate switches, reference numeral 413 denotes a second demultiplexer, reference numeral 423 represents a signal recording/reproducing means, and reference numeral 404 indicates a first demultiplexer. Also, reference numeral 405 indicates an MPEG2 decoder, reference numeral 406 indicates a video encoder, reference numeral 407 is a D/A converter, reference numeral 408 indicates an On Screen Display (OSD), reference numeral indicates a control means, reference numeral 410 indicates a television set, reference numerals 434 and 415 each are Random Access Memory (will be referred to as a "RAM" hereinafter) used to decompress data by the first demultiplexer 404 and the MPEG2 decoder 405, and reference numeral 419 indicates a Read-Only Memory (will be referred to as a "ROM" hereinafter) for storing an operation program of the control means 409.

In FIG. 1, the radio wave transmitted from a satellite (not shown) is received by the antenna 300, and then is converted into the tuner input signal by the converter 301. The tuner input signal is entered via the cable 302 to the tuner 401. In the example shown in FIG. 1, the tuner 401 selects a desired signal from the input signal in accordance with the setting condition of the control means, and then outputs the desired signal. The output signal from the tuner 401 is demodulated by the QPSK demodulator 402, and then the demodulated signal is entered into the FEC 403. The FEC corrects the errors of the digital input signal, caused by the signal transmission.

The digital signal which is obtained by executing the error correction of the input signal in the above-described manner is inputted via the switches 414 and 424 to the first demultiplexer 404. Generally speaking, the digital satellite broadcasting system as explained in the present embodiment is featured in that a plurality of programs can be multiplexed on a single radio wave which is relayed by a radio wave transponder (not shown) mounted on a satellite. A desired program is selected from the multiplexed program by the first demultiplexer 404. A digital signal separated by the first demultiplexer 404 is entered into the MPEG2 decoder 405. The MPEG2 decoder 405 decompresses the compressed digital signal to reproduce both a digital video signal before being compressed and a digital audio signal before being compressed. The reproduced digital video signal is entered via the OSD 408 to the video encoder 406, and the reproduced digital audio signal is entered into the D/A converter 407. The video encoder 406 converts the entered digital video signal into an analog video signal which will then be outputted to the television set 410. On the other hand, the D/A converter 407 converts the inputted digital audio signal into an analog audio signal which will then be outputted to the television set 410. The above-described operations are controlled by the control means 409 operated in accordance with the program stored in the ROM 419.

Figure 2A:
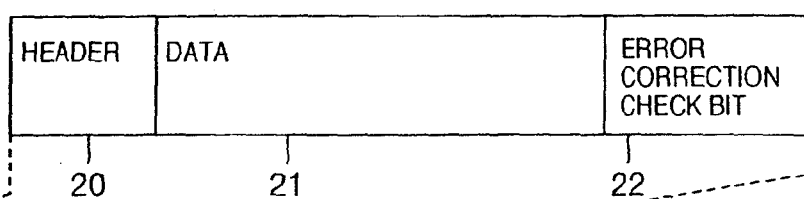
FIGS. 2A-2C are an illustration for showing a packet structure and a method of packet multiplexing.
Figure 2B:
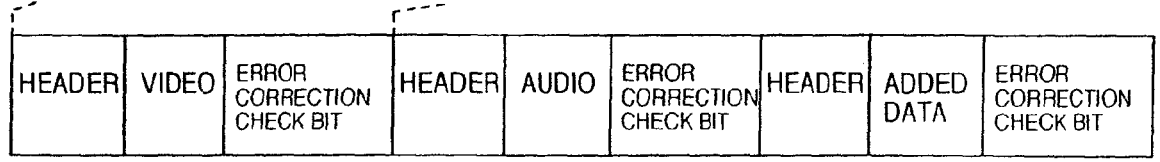
Figure 2C:
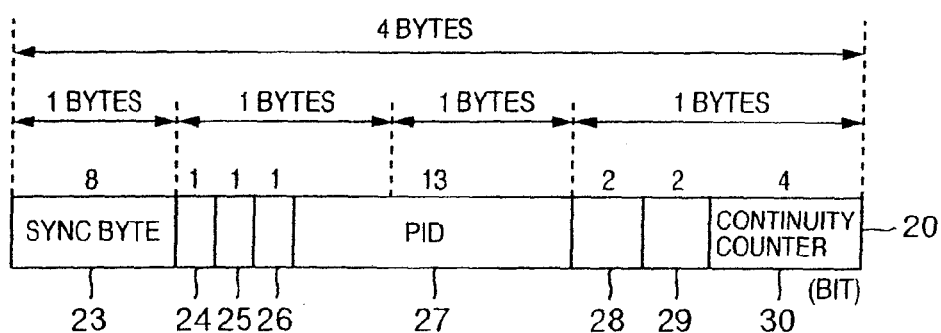
Figure 3:
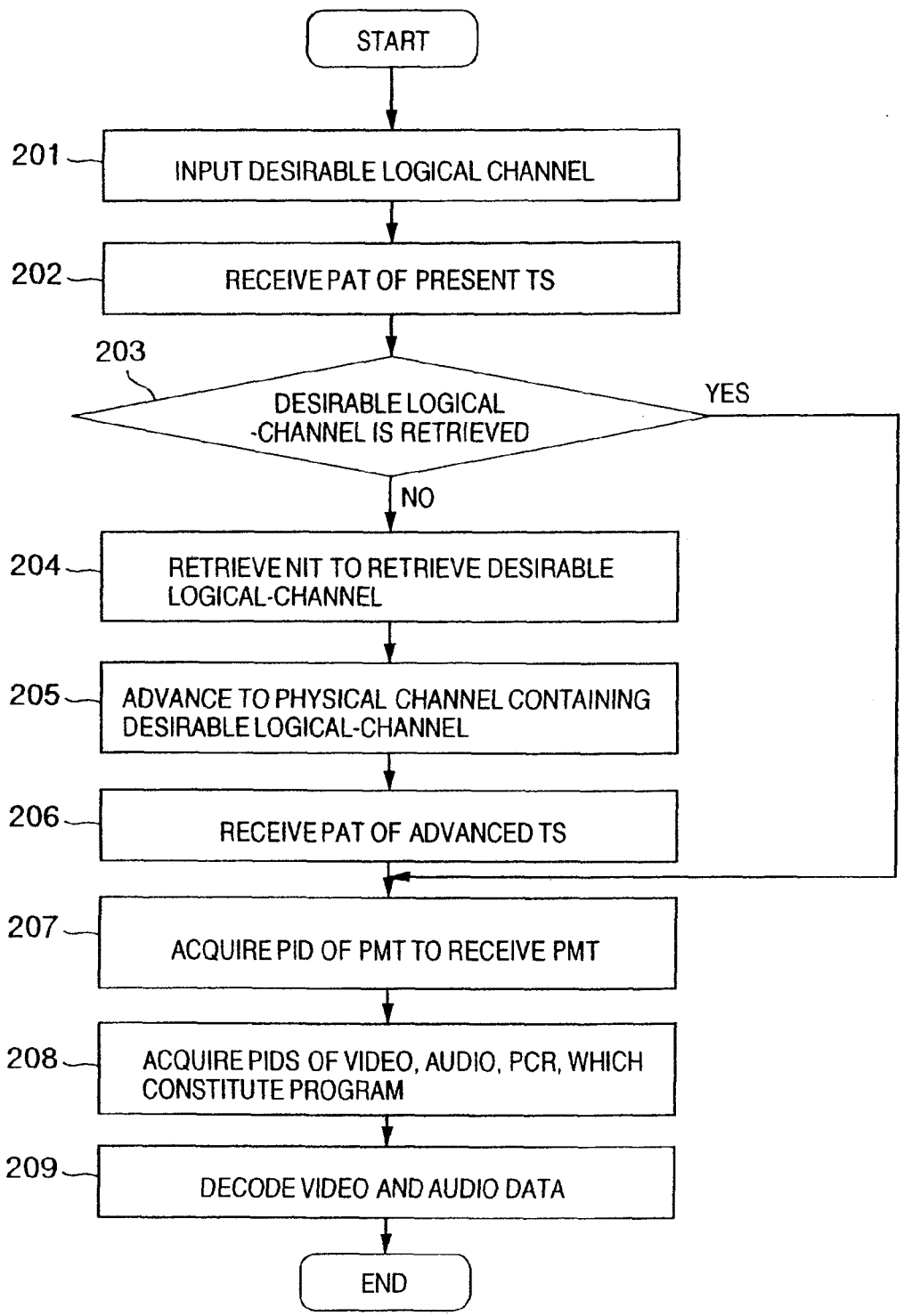
FIG. 3 is a flow chart for describing a sequential operation of a program representation when a digital broadcasting signal is received.

Referring now to FIG. 2 and FIG. 3, a description will be made of an example of a general-purpose sequential operation for separating desired program information in the first demultiplexer 404. A signal entered into the first demultiplexer 404 of FIG. 1 owns such a structure that a packet indicated in FIG. 2A has been multiplexed as indicated in FIG. 2B. FIG. 2A shows an example of the method of pocket multiplexing. The signal multiplexed as shown in FIG. 2B is processed by the first demultiplexer 404.

It should be noted that FIG. 2C indicates a structural example of a header 20 shown in FIG. 2A, reference numeral 23 shows a synchronization (sync) byte equal to a fixed pattern indicative of a head of the header 20, reference numeral 24 indicates a transport error indicator, reference numeral 25 represents a payload unit start indicator, reference numeral 26 shows a transport priority, reference numeral 27 denotes a PID indicative of an attribute of a packet, reference numeral 28 is a transport scramble control, reference numeral 29 represents an adaptation field control, and reference numeral 30 shows a continuity counter. They indicate various sorts of attributes and conditions related to the respective packets, are constructed of 4 bytes. Each of these numerals indicates a bit number.

An example of the operations executed in the first demultiplexer 404 is shown in a flow chart of FIG. 3. At a first step 201, an observer enters a desirable logical channel. The logical channel implies such a general name for combining video and audio information for constituting one program, and corresponds to a television channel, used in the conventional analog broadcasting system. Generally speaking, in a digital broadcasting system, a single frequency at which a plurality of programs are multiplexed is referred to as a physical channel. At the next step 202, for instance, a PAT(Program Association Table) is received, which corresponds to one of packets for constituting the multiplexed signal (will be referred to as a "TS(Transport Stream)" hereinafter) shown in FIG. 2 under reception. It should also be noted that "PAT" is equal to one of the tables contained in PSI(Program Specific Information) defined by the international standard rule MPEG2. Also, PID indicative of being PAT is defined to have a specific value. As a consequence, for instance, when PID of PAT is previously stored in the ROM 419, the first demultiplexer 404 can receive the PAT, irrelevant to the information contained in the signal under reception. At a subsequent step 203, a check is made as to whether or not a desirable logical channel is contained in the added data of the PAT received at the step 202. If the desirable logical channel is present, then the process operation is advanced to a step 207. Conversely, when the desirable logical channel is not present, the process operation is advanced to a step 204. At this step 204, an NIT (Network Information Table) corresponding to one of PSI is received to acquire a physical channel containing the desirable logical channel, and in the NIT, a relationship between the physical channel and the logical channel contained in the added data is described. Then, at a step 205, the process operation is advanced to the physical channel acquired at the step 204. In the actual circuit, the physical channel is advanced by setting such a frequency to be selected into the tuner 401 by the control means 409. Thereafter, at a step 206, a PAT is received which is equal to one of packets for constructing the multiplexed signal TS in the advanced physical channel. Upon receipt of the PAT, at the next step 207, a PMT (Program Map Table) is acquired, and such a PMT containing the above-described PID is received. In the PMT, a PID (Packet ID) such as the video and the audio for constituting the desirable logical channel entered at the step 201 is described.

In this case, the PMT is constructed of a header and the region of the added data in FIG. 2B, and is equal to one of the PSI tables. Also, in the PID, a packet PID for such as a PCR(Program Clock Reference) is described, and the PCR indicates the video, the audio, and the time information, which constitute each of the logical channels contained in the TS under reception. Accordingly, at a step 208, the packet PID for such as the video, the audio, and the PCR of the desired program is acquired. The PID subsequently acquired is set to the first demultiplexer 404 shown in FIG. 1 at a step 209, a desirable video stream and a desirable audio stream are received and then are entered into the MPEG2 decoder 405 so as to be decoded therein.

The video signal which has been decoded by the above-explained operation is processed via the OSD 408 by the NTSC encoder 406 to be thereby converted into the analog video signal. Also, the audio signal is converted into the analog audio signal by the D/A converter 407. Then, both the analog video signal and the analog audio signal are entered into the television 410, so that the program desired by the observer can be represented, or displayed.

Next, a description will be made of a sequential operation in which the received signal is supplied via the switch 414 and the second demultiplexer 413 to the recording/reproducing means 423 so as to record the received digital signal, and the digital signal recorded from the recording/reproducing means 423 via the switch 424 is reproduced.

In the case that the digital signal is recorded on the recording/reproducing means 423, the switch 414 is switched under control of the control means 409 in such a manner that the FEC 403 is connected to the second demultiplexer 413. The second demultiplexer 413 is equal to a means for deriving only data required to reproduce only a desired program in response to the instruction issued from the control means 409 when the recorded signal is reproduced by the observer. In the embodiment of FIG. 1, in addition to the respective packets for such as the PAT, PMT, video, and audio, only a PCR (Program Clock Reference) and information (pf EIT) related to the desired program (namely, presently observed program) among the program related information are derived. The PCR corresponds to the data indicative of the time information required in the MPEG2 decoder 405.

Figure 13:
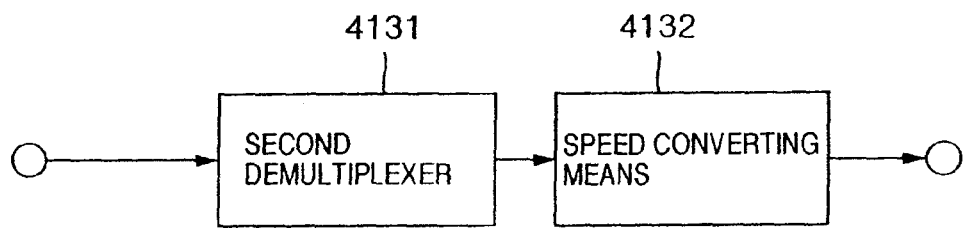
FIG. 13 is a block diagram for representing another structure of the second demultiplexer of the present invention.

Another arrangement of the second demultiplexer 413 in FIG. 1 is represented in FIG. 13. The second demultiplexer 413 is arranged by a demultiplexer 4131 for extracting desirable information, corresponding to the second demultiplexer 413 shown in FIG. 2, and a speed converting means 4132 for speed-converting the transfer rate of the output signal from the demultiplexer 4131 in order that the transfer rate is fitted to the recording/reproducing means 423. The speed converting means 4132 corresponds to, specifically speaking, a FIFO (First-In/First-Out) memory, for example.

Figure 14:
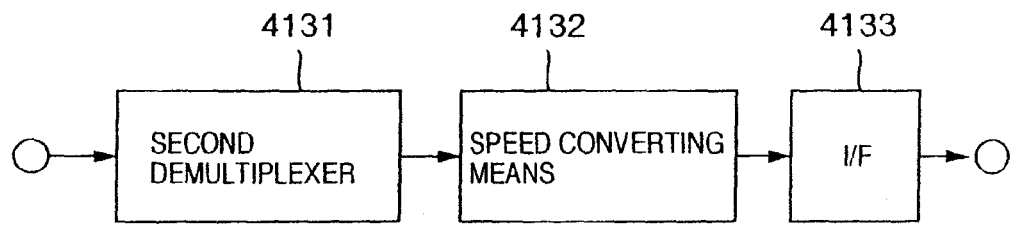
FIG. 14 is a block diagram for showing a further structure of the second demultiplexer of the present invention.

A further arrangement of the second demultiplexer 413 of FIG. 1 is indicated in FIG. 14. This arrangement of FIG. 14 is equipped with an interface means 4133 in addition to the above-described arrangement shown in FIG. 13. That is, reference numeral 4133 is an interface means between the second demultiplexer 413 of FIG. 1, and the recording/reproducing means 423, for instance, such an interface means for converting a parallel signal into a serial signal when the signal outputted from the speed converting means 4132 is the parallel signal.

The signal extracted by the second demultiplexer 413 having such an arrangement as shown in FIG. 1, FIG. 13, or FIG. 14 is recorded on the recording/reproducing means 423. During the reproducing operation, the digital signal reproduced by the recording/reproducing means 423 is entered via the switch 424 to the first demultiplexer 404.

Figure 4:
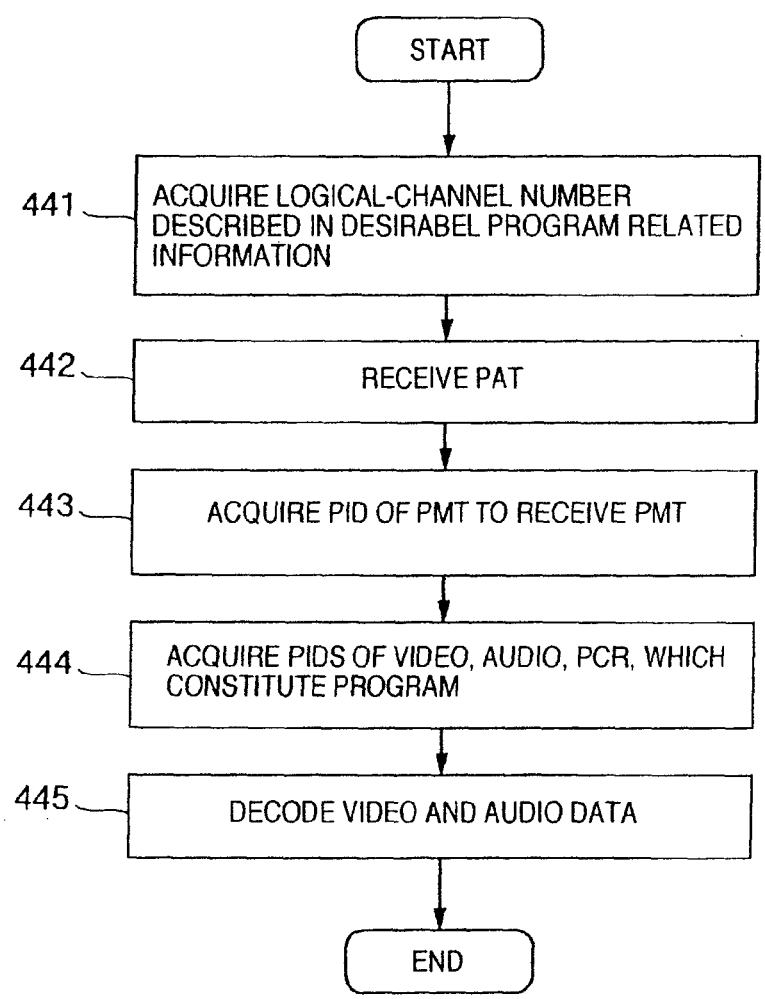
FIG. 4 is a flow chart for describing a sequential operation of a program representation when a recorded digital broadcasting signal is reproduced.

When the signal recorded on the recording/reproducing means 423 is reproduced, the first demultiplexer 404 is operated in accordance with a sequential operation shown in FIG. 4 under control of the control means 409. Now, the sequential operation will be described. It should be noted that since, in general, the PID indicative of the program related information is represented by a specific value, irrelevant to the program, this condition is also employed as the initial condition of this embodiment.

When a digital signal is entered from the recording/reproducing means 423, under control of the control means 409, the first demultiplexer 404 receives desired program related information to thereby acquire the number of a logical channel described in the desired program related information as indicated at a first step 441 of FIG. 4. At the next step 442, a PAT(Program Association Table) is received. At this stage, since the channel number of the recorded channel edited channel is known at the step 441, a PID(Packet ID) of a PMT(Program Map Table) in which the packet PID(Packet ID) such as the video and the audio of the recorded program is described can be immediately acquired. The following sequential operation is similar to the sequential operation as explained in FIG. 3.

As previously described, in accordance with the first embodiment, the program reproduced from the recording/reproducing means 423 on which the program has been recorded under condition of the digital multiplexed signal can be immediately demultiplexed and decoded to be displayed without the complex operation by the observer. Furthermore, since the desired program related information is recorded, the services using the information related to the program can be improved, which constitutes one of the features provided by the digital broadcasting system.

Figure 5:
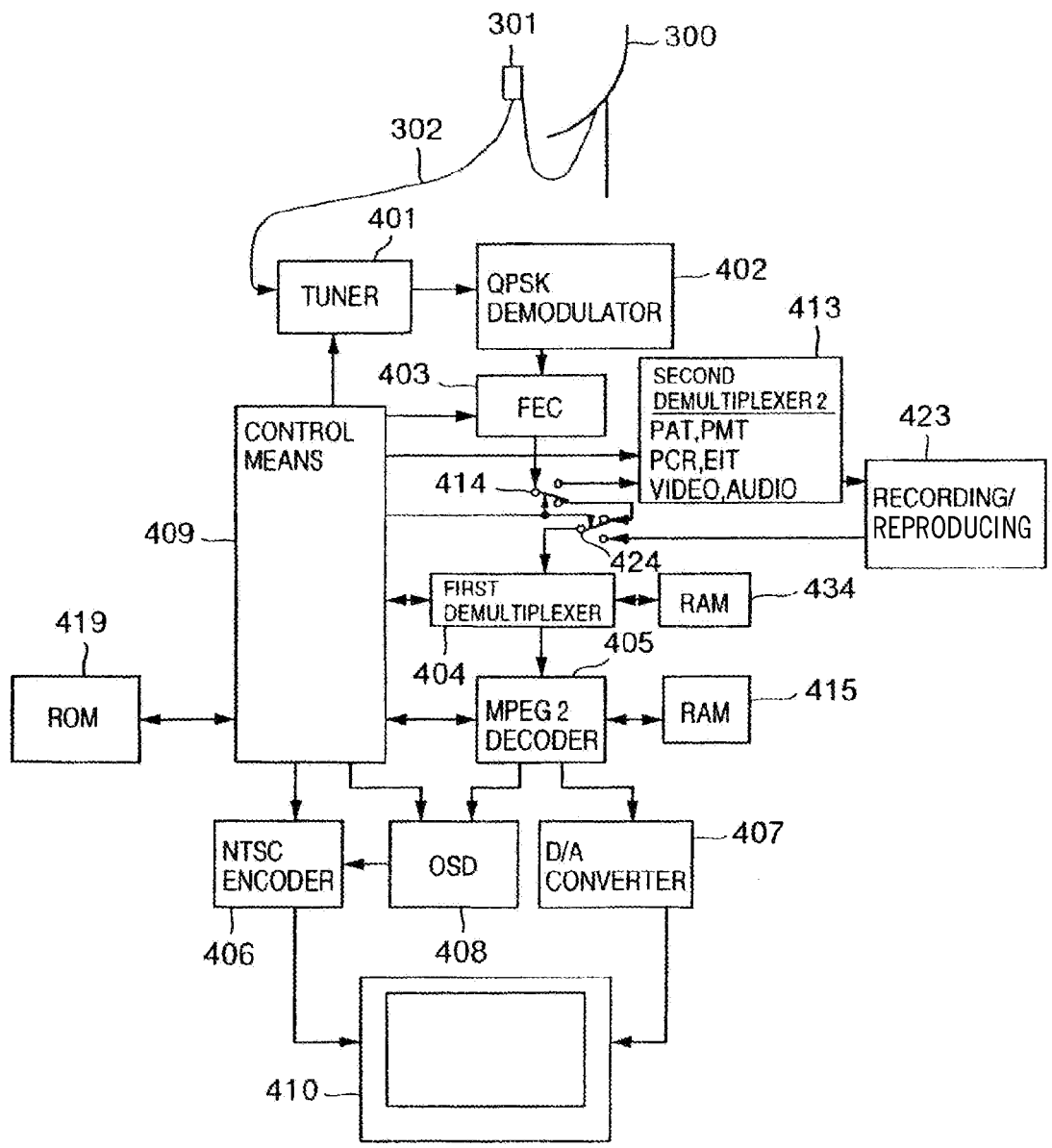
FIG. 5 is a schematic block diagram for showing an arrangement of a digital broadcasting signal receiving/recording/reproducing apparatus according to a second embodiment of the present invention.

FIG. 5 represents an arrangement of a digital broadcasting signal receiving/recording/reproducing apparatus according to a second embodiment of the present invention. It should be understood that in the first embodiment of FIG. 1, the second demultiplexer 413 extracts only the desired program related information in response to the instruction issued by the control means 409. In contrast thereto, in accordance with the embodiment of FIG. 5, the second demultiplexer 413 is so arranged that this second demultiplexer 413 extracts all of the program related information in response to the instruction issued from the control means 409 without discriminating as to whether or not the received information corresponds to such an information related to a desired program, and the extracted all program related information is recorded on the recording/reproducing means 423.

Figure 6:
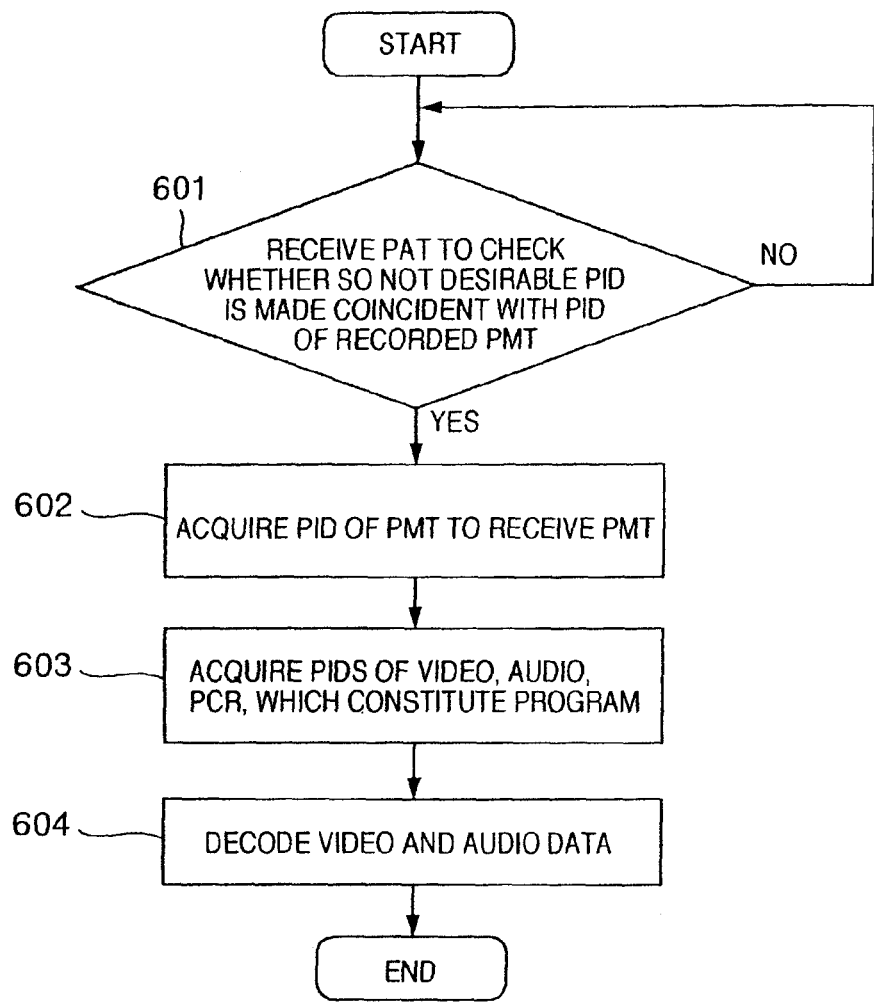
FIG. 6 is a flow chart for describing a sequential operation of a program representation in response to a reproduction signal derived from recording/reproducing apparatus in the arrangement of FIG. 5.

FIG. 6 shows a sequential operation for processing a reproduction signal derived from the recording/ reproducing means 423 in the case where the arrangement of the embodiment shown in FIG. 5 is employed. That is, the sequential operation of FIG. 6 eliminates the process operation for acquiring the logical channel from the desired program related information as defined at the step 441 of the sequential operation shown in FIG. 4. Then, at a first step 601, a check is made as to whether or not the information of the logical channel is made coincident with the PMT on which the PID described in the PAT has been recorded. If this information is not made coincident with the PMT, then the process operation defined at the step 601 is repeatedly performed until this information is made coincident with the PMT. Conversely, if the information is made coincident with this PMT, the process operation is advanced to a process operation defined at a step 602. The subsequent operation is identical to the process operations defined after the step 443 of FIG. 4.

In accordance with the second embodiment of FIG. 5, the circuit arrangement of the second demultiplexer 413 can be made simpler than that of the first embodiment shown in FIG. 1. Also, similar to the first embodiment of FIG. 1, it is possible to improve the services while using the information related to the program described in the program related information.

Figure 7:
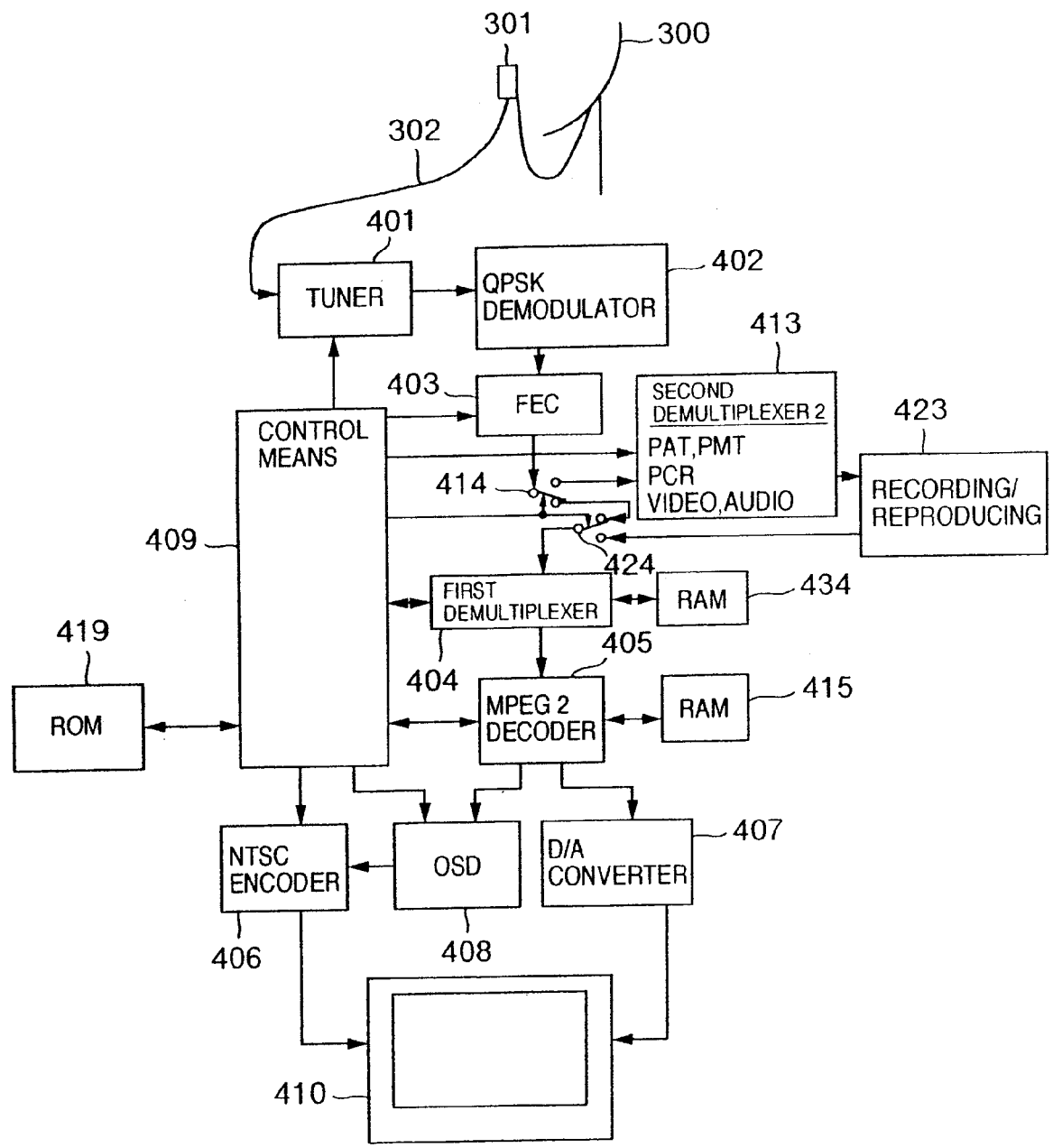
FIG. 7 is a schematic block diagram for indicating an arrangement of a digital broadcasting signal receiving/recording/reproducing apparatus according to a third embodiment of the present invention.

FIG. 7 schematically shows arrangement of a digital broadcasting signal receiving/recording/reproducing apparatus according to a third embodiment of the present invention. The third embodiment of FIG. 7 exhibits a difference from the second embodiment of FIG. 5 such that the second demultiplexer 413 does not extract the program related information, but extracts only PAT, PMT, PCR and video/audio data under control of the control means 409. As a result, the arrangement of the second demultiplexer 413 can be furthermore simplified, as compared with that of the second embodiment shown in FIG. 5.

Figure 8:
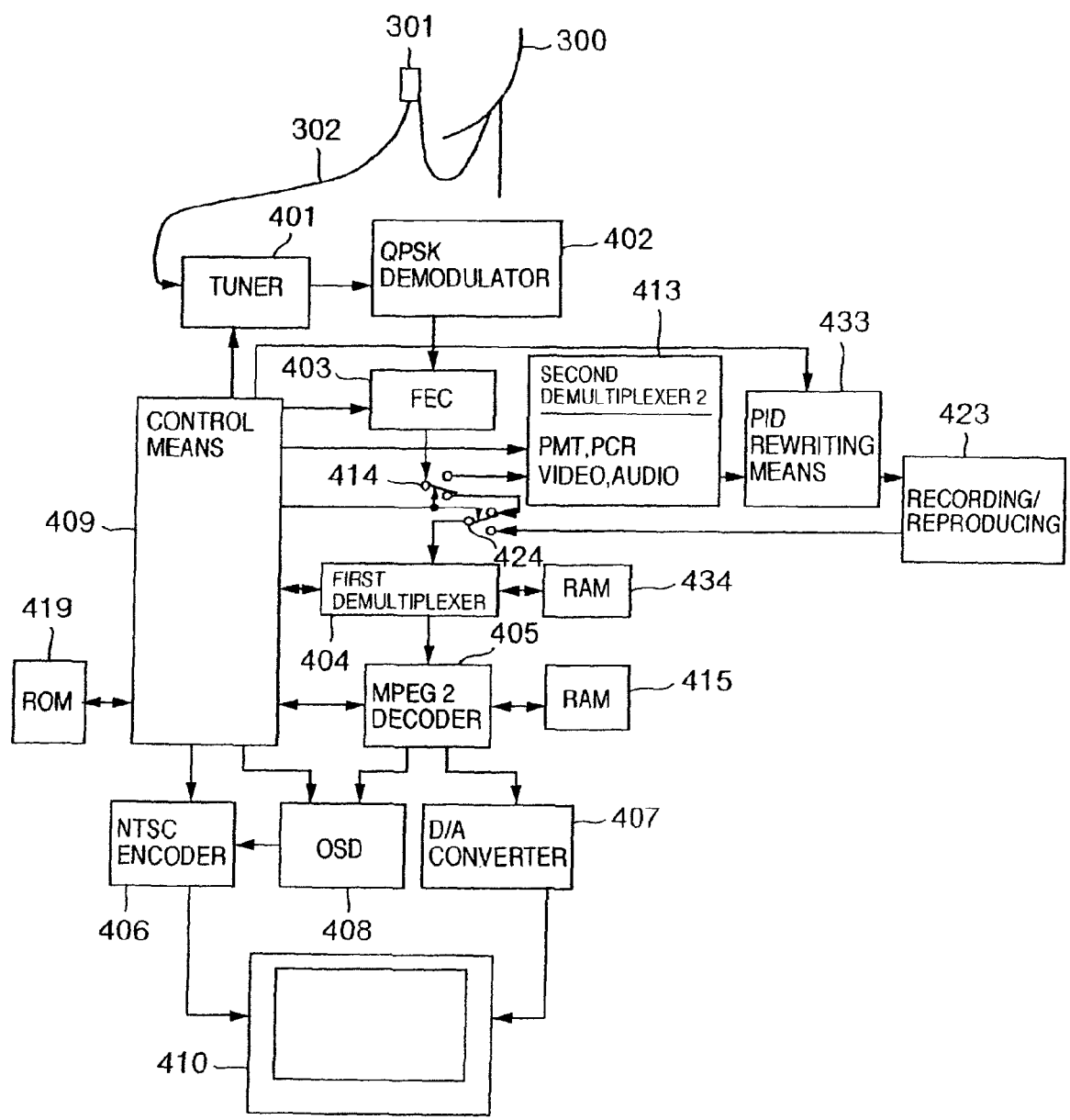
FIG. 8 is a schematic block diagram for indicating an arrangement of a digital broadcasting signal receiving/recording/reproducing apparatus according to a fourth embodiment of the present invention.

FIG. 8 schematically shows arrangement of a digital broadcasting signal receiving/recording/reproducing apparatus according to a fourth embodiment of the present invention. The fourth embodiment of FIG. 8 exhibits a difference from the first embodiment of FIG. 1 such that the second demultiplexer 413 of FIG. 8 extracts only PMT, PCR and audio data under control of the control means 409, and also, a PID rewriting means 433 is employed. That is, in the fourth embodiment of FIG. 8, the PID rewriting means 433 is so arranged that the PID of the PMT is rewritten into a specific value set by the control means, and a signal of the specific value is recorded on the recording/reproducing means 423. As a result, when the recorded signal is reproduced, since the PID of the PMT is previously recognized, the PIDs of the video/audio data and the PCR described in the PMT can be immediately acquired. Similar to the first embodiment of FIG. 1, these video/audio data, and the PID of the PCR can be immediately reproduced without any complicated operation.

Figure 9:
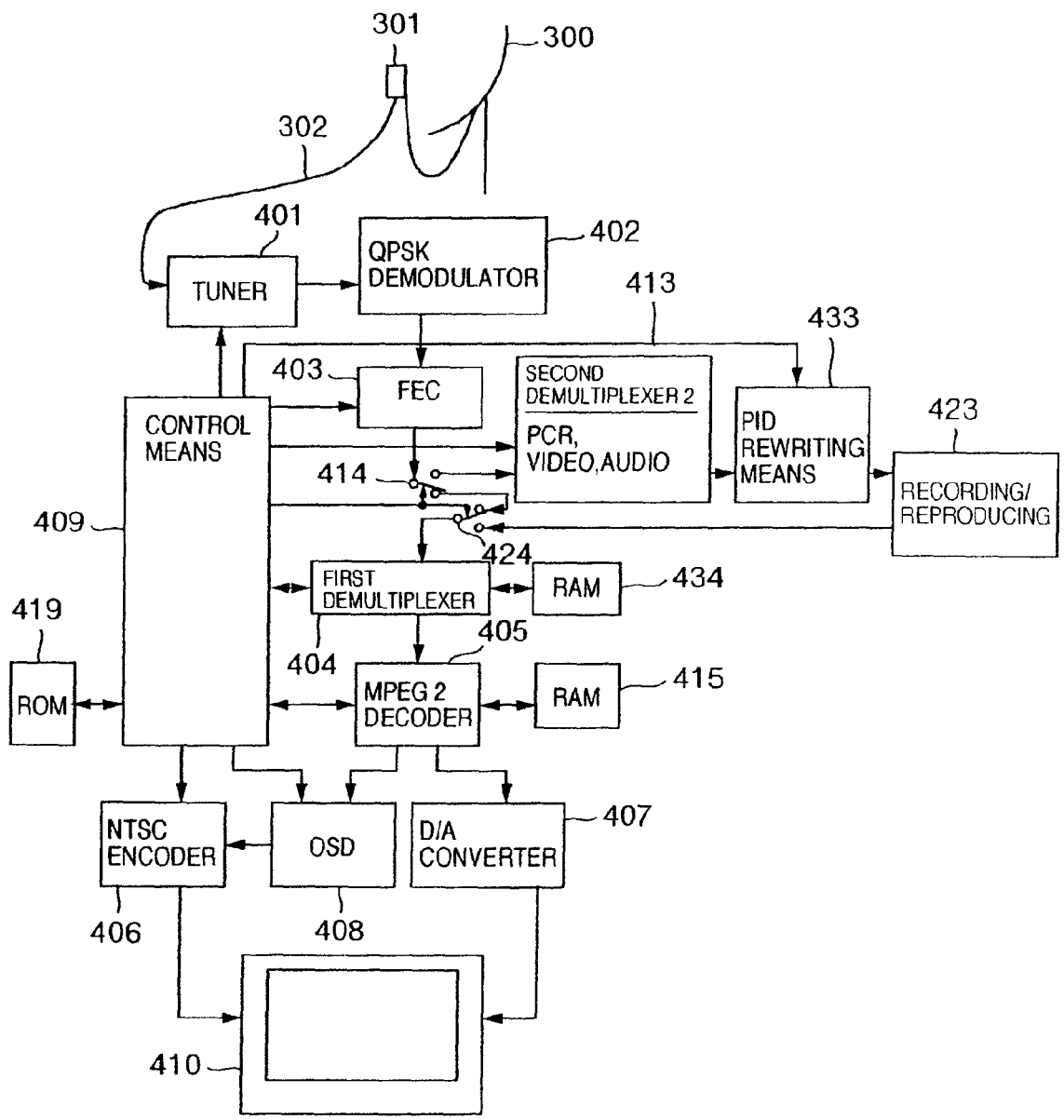
FIG. 9 is a schematic block diagram for indicating an arrangement of a digital broadcasting signal receiving/recording/reproducing apparatus according to a fifth embodiment of the present invention.

FIG. 9 schematically shows arrangement of a digital broadcasting signal receiving/recording/reproducing apparatus according to a fifth embodiment of the present invention. The fifth embodiment of FIG. 9 exhibits a difference from the fourth embodiment of FIG. 8 such that the second demultiplexer 413 of FIG. 9 extracts only PCR and video/audio data under control of the control means 409, and also the PIDs of the PCR, and of the video/audio data are rewritten by a PID rewriting means 433 into a specific value set by the control means 409.

In accordance with the fifth embodiment of FIG. 9, during the reproducing operation, since the PIDs of the recorded PCR, and the video/audio data are previously recognized, these PCR, and the video/audio data can be immediately reproduced without any complex operation by the user, similar to the first embodiment shown in FIG. 1. Also, the amount of the recorded information can be reduced, as compared with that of the fourth embodiment shown in FIG. 8, and further the arrangement of the second demultiplexer 413 can be simplified.

Figure 10:
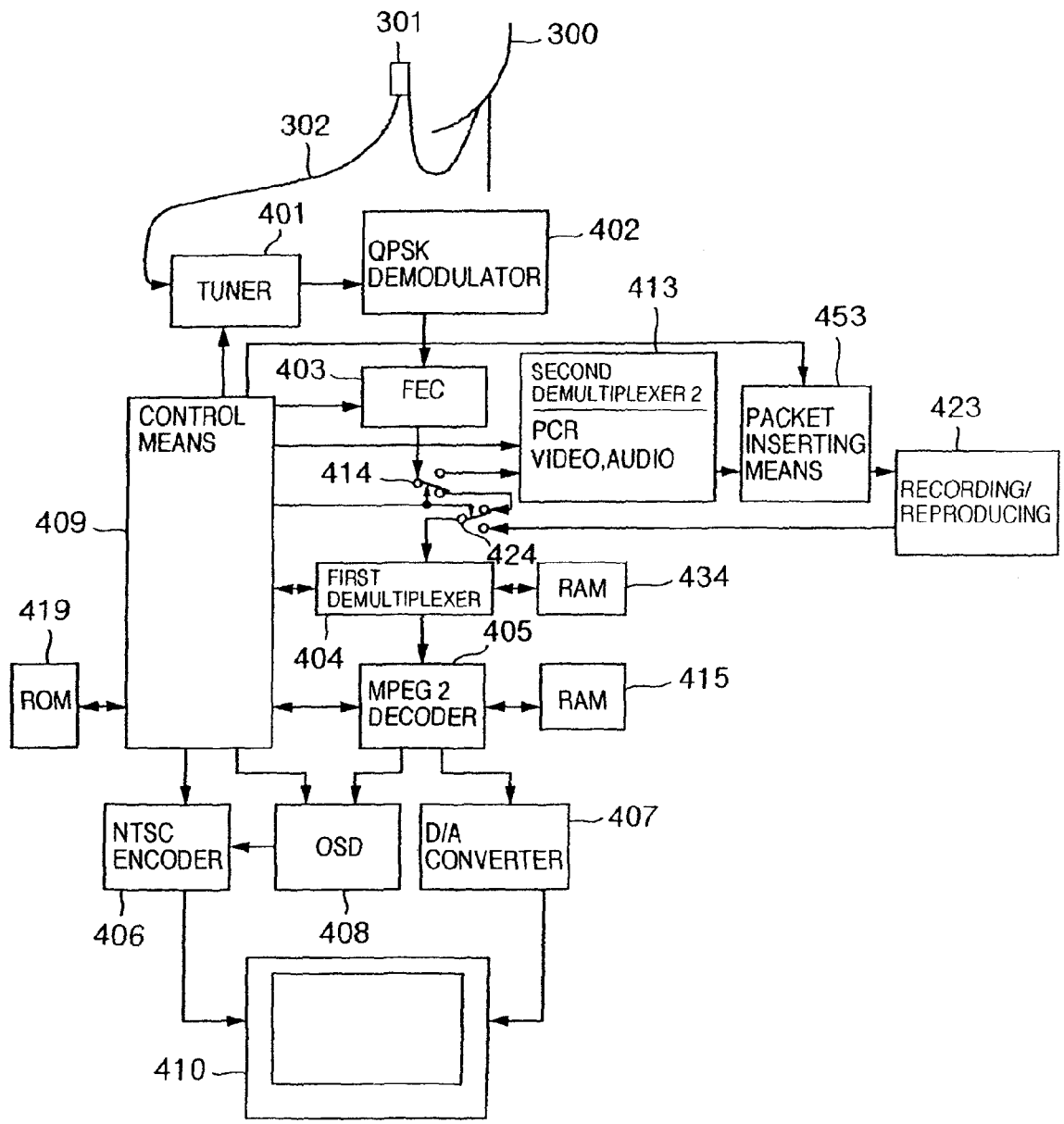
FIG. 10 is a schematic block diagram for indicating an arrangement of a digital broadcasting signal receiving/recording/reproducing apparatus according to a sixth embodiment of the present invention.

FIG. 10 schematically shows arrangement of a digital broadcasting signal receiving/recording/reproducing apparatus according to a sixth embodiment of the present invention. The sixth embodiment of FIG. 10 exhibits a difference from the fifth embodiment of FIG. 9 such that a packet inserting means 453 shown in FIG. 10 is employed as the PID rewriting means 433 of FIG. 9. In the sixth embodiment of FIG. 10, the second demultiplexer 413 acquires a desirable PCR, and PIDs of various information such as video/audio data, and extracts the above-described PCR, video, and audio to be supplied to the packet inserting means 453. The packet inserting means 453 forms a packet into which the PIDs such as the PCR, the video, and the audio acquired in the second de multiplexer 413 are described, and then insets this packet into the input signal derived from the second demultiplexer 413. Then, the inserted input signal is recorded on the recording/reproducing means 423. When the recorded signal is reproduced, the first demultiplexer 404 is first controlled by the control means 409 in such a manner that the first demultiplexer 404 receives the packet inserted by the packet inserting means 453 to thereby acquire the PIDs of the PCR, the video, and the audio described in this received packet. As a consequence, similar to the fifth embodiment of FIG. 9, the desired program can be immediately represented without any complex operation by the user. It should be understood that as the PID of the packet inserted by the packet inserting means, the PID same as the PAT defined by the MPEG2 rule may be applied. Since the MPEG2 rule defines that the PID of the PAT is set to a specific value, when the signal reproduced from the recording/reproducing means 423 is processed in the first demultiplexer 404, the process operation explained with reference to FIG. 10 may be realized by presetting that the control means 409 first controls the first demultiplexer 404 so as to extract such a packet having the same PID as that of the PAT.

As previously described, since the sixth embodiment of the present invention shown in FIG. 10 is employed, the desired program can be immediately displayed without any operation by the user.

Figure 11:
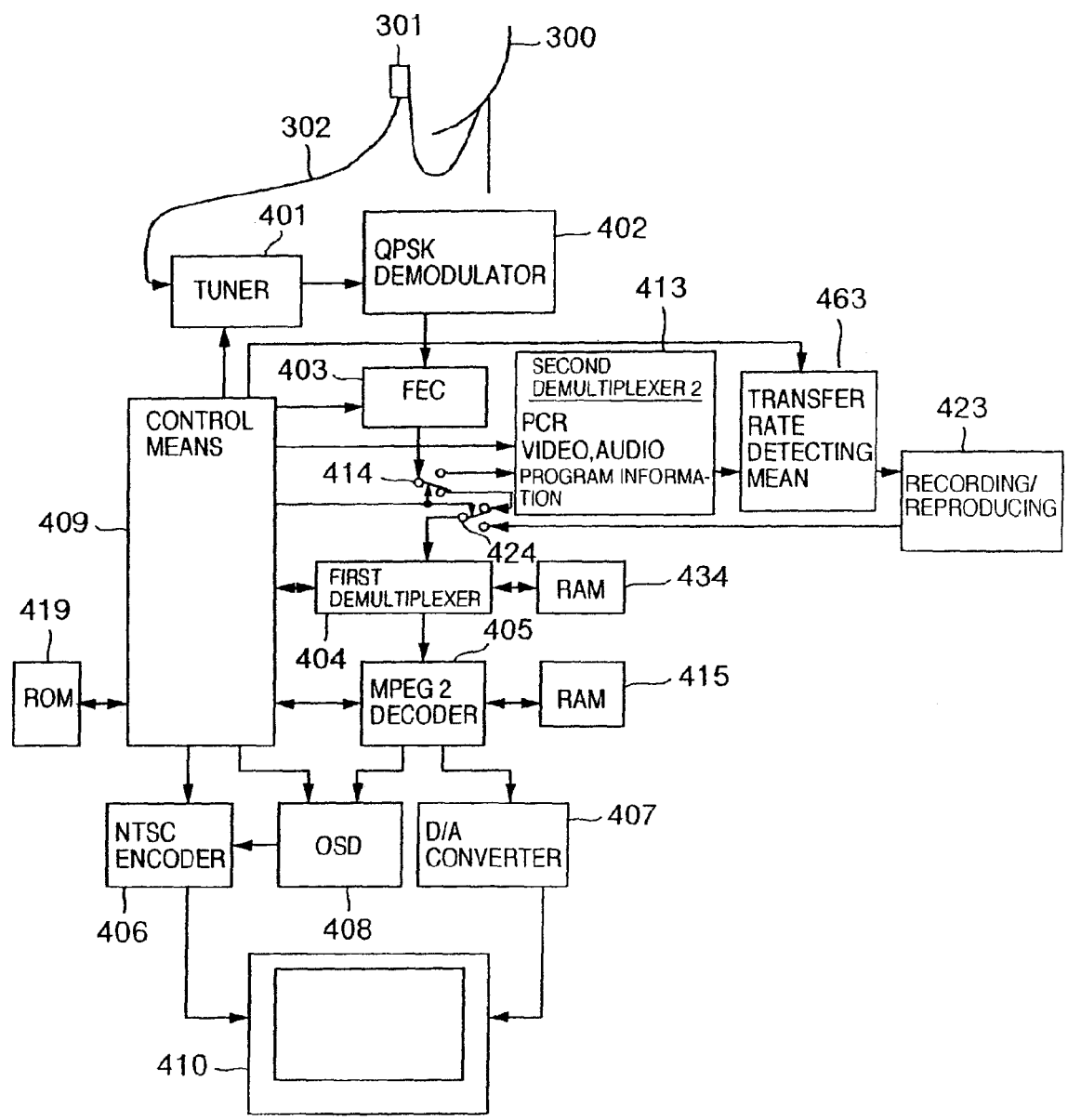
FIG. 11 is a schematic block diagram for indicating an arrangement of a digital broadcasting signal receiving/recording/reproducing apparatus according to a seventh embodiment of the present invention.

FIG. 11 is a schematic block diagram for showing an arrangement of a digital broadcasting signal receiving/recording/reproducing apparatus according to a seventh embodiment of the present invention. In FIG. 11, reference numeral 463 is a transfer rate detecting means. In FIG. 11, similar to the embodiment shown in FIG. 1 or FIG. 5, the second demultiplexer 413 extracts the information such an the video and the audio, and also the added data such as the program information in response to the instruction issued from the control means 409. The TS (Transport Stream) outputted from the second demultiplexer 413 is inputted to the transfer rate detecting means 463. When the transfer rate detecting means 463 detects that the transfer rate of the inputted TS exceeds a preset specific value, the transfer rate detecting means 463 outputs such a signal to the control means 409 by notifying such a fact that the transfer rate exceeds the preset value. When the notification signal is entered from the transfer rate detecting means 463, the control means 409 controls the second demultiplexer 413 in such a manner that the information not for directly giving the influence to the display of the program is riot extracted in accordance with a preset priority order. In other words, for example, when the transfer rate of the TS outputted from the second demultiplexer 413 exceeds a preset value, the extracting operation of the program information is stopped. As a consequence, the transfer rate of the multiplexed signal outputted from the second demultiplexer 413 becomes smaller than, or equal to a constant value.

As previously explained, in the seventh embodiment of FIG. 11, in the case that for example, as the recording/reproducing means 423, such a recording means is employed in which there is an upper limit in the transfer rate of the recordable multiplexed signal, the information such as the video and the audio, which constitute the program is recorded in connection with the added information such as the program information so as to increase the additive value unless the multiplexed signal to be recorded exceeds the preset transfer rate. Even when the transfer rate of the multiplexed signal to be recorded exceeds the preset transfer rate, the extracting operation of such information which has no direct relationship with the representation of the program content is stopped, so that the program information can be recorded.

Figure 12:
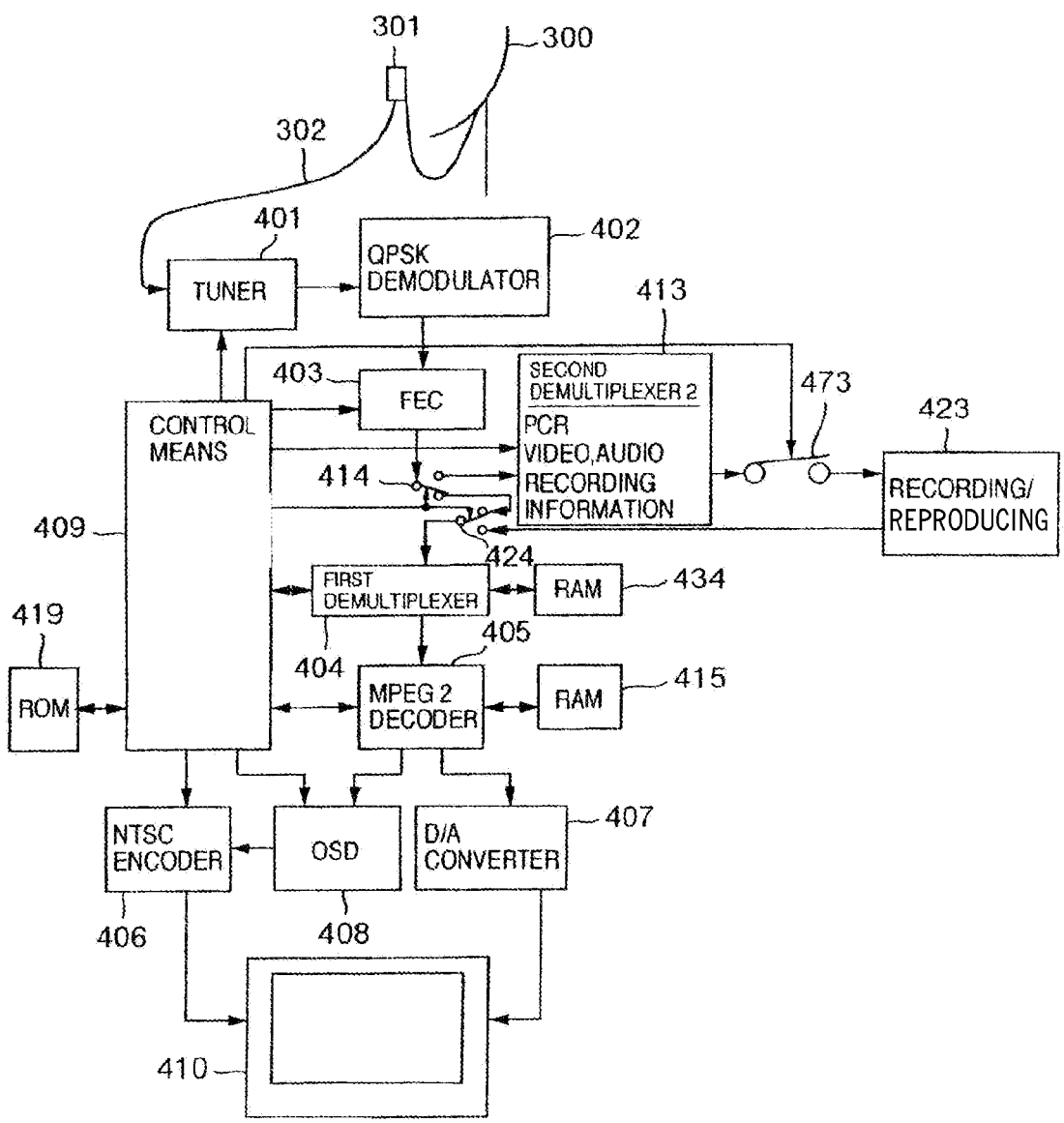
FIG. 12 is a schematic block diagram for indicating an arrangement of a digital broadcasting signal receiving/recording/reproducing apparatus according to a eighth embodiment of the present invention.

FIG. 12 is a schematic block diagram for representing an arrangement of a digital broadcasting signal receiving/recording/reproducing apparatus according to an eighth embodiment of the present invention. In FIG. 12, reference numeral 473 is a switch means. In FIG. 12, in response to the instruction issued from the control means 409, the second demultiplexer 413 extracts recording related information as to protections of copyright, and when such an information that recording operation is prohibited as the recording related information is extracted, the control means 409 detects that the information of prohibiting the recording operation is extracted, and control the switch means 473 based on the detected information. As a result, the signal outputted from the second demultiplexer 413 is not applied to the recording/reproducing means 423.

In other words, when the signal is transmitted on the transmission side, to which such information for notifying that the recording operation is prohibited so as to protect the copyright is added, the digital broad-casting signal receiving/recording/reproducing apparatus can be operated in Accordance with this information by employing the eighth embodiment of FIG. 12.

As apparent from the eighth embodiment of FIG. 12, although the switch means 437 for prohibiting the recording operation is employed, even when a partial operation (speed converting means 4132 etc.), or all operations of the second demultiplexer 413 are stopped under control of the control means 409, a similar effect may be achieved.

It should also be noted that although the first demultiplexer 404 and the second demultiplexer 413 have been described as the separate circuits in the embodiments, these two means may be constituted as a single circuit block.

Figure 15:
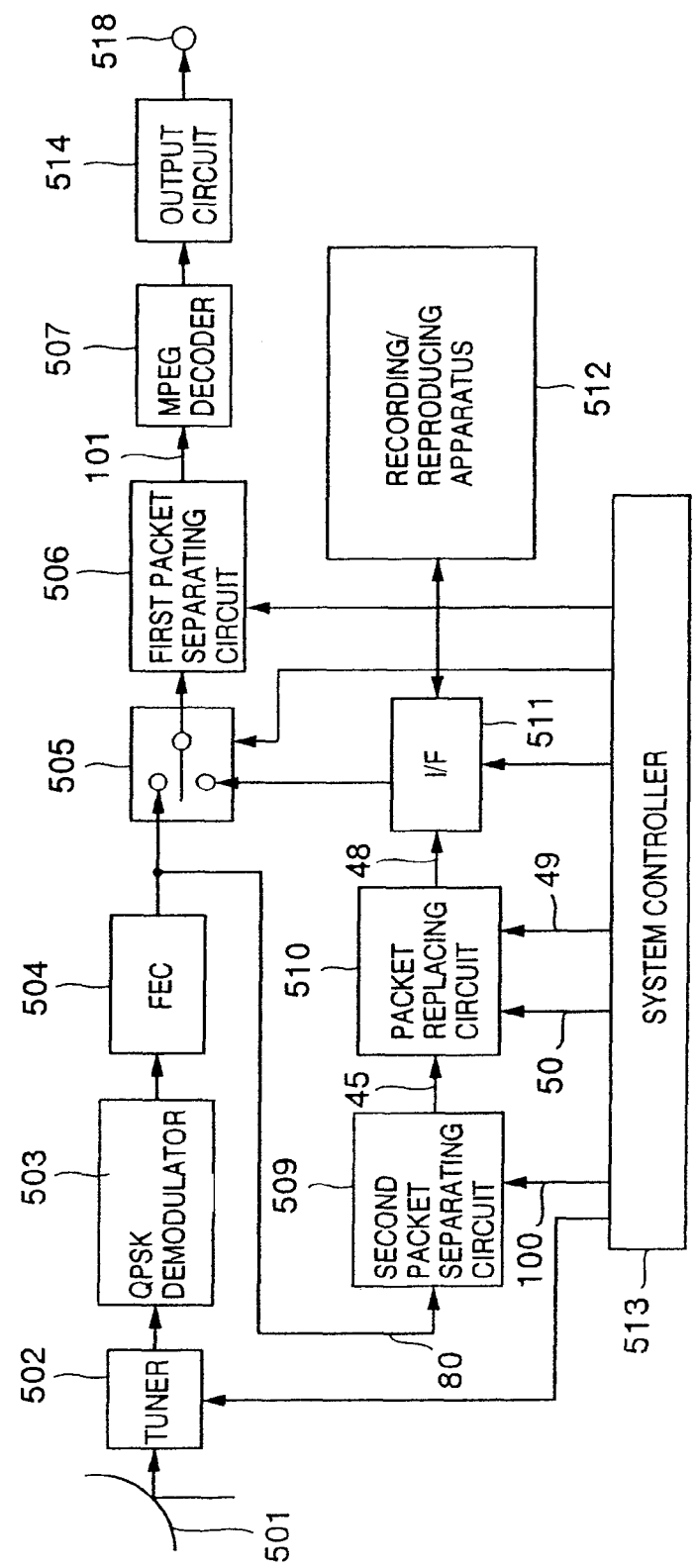
FIG. 15 is a schematic block diagram for indicating an arrangement of a digital broadcasting signal receiving/recording/reproducing apparatus according to a ninth embodiment of the present invention.

FIG. 15 is a schematic block diagram for showing an arrangement of a digital broadcasting signal receiving/recording/reproducing apparatus according to a ninth embodiment of the present invention.

In FIG. 15, reference numeral 501 shows an antenna, reference numeral 502 indicates a tuner, reference numeral 503 denotes a QPSK demodulator, and reference numeral 504 shows a forward error correction (FEC) for correcting an error in a transmitted signal. Also, reference numeral 505 is a switch, reference numeral 506 shows a first packet separating circuit, reference numeral 507 denotes an MPEG2 decoder, reference numeral 508 is a video/audio output terminal, reference numeral 509 shows a second packet separating circuit, reference numeral 510 represents a packet replacing circuit, reference numeral 511 denotes an interface circuit, reference numeral 512 indicates a recording/reproducing apparatus, reference numeral 513 is a system controller, reference numeral 514 shows an output circuit, and reference numeral 518 denotes a video/audio output terminal. In FIG. 15, the radio wave transmitted from a satellite (not shown) is received by the antenna 501, and then this signal is entered to the tuner 502. In the example shown in FIG. 15, the tuner 502 selects a desirable signal from the input signal in accordance with the setting condition of the system controller 513, and then outputs the desirable signal. The output signal from the tuner 502 is demodulated by the QPSK demodulator 503, and then the demodulated signal is entered into the FEC 504. The FEC 504 corrects the errors of the digital input signal, caused by the signal transmission.

The digital signal which is obtained by performing the error correction of the input signal in the above-described manner is inputted via the switch 505 to the first packet separating circuit 506. Generally speaking, the digital satellite broadcasting system as explained in the present invention is featured in that a plurality of programs can be multiplexed on a single radio wave which is relayed by a radio wave transponder (not shown) mounted on a satellite. A desired program is selected from the multiplexed program by the first packet separating circuit 506. A digital signal separated by the first packet separating circuit 506 is entered into the MPEG2 decoder 507. The MPEG2 decoder 507 decompresses the compressed digital signal to reproduce both a digital video signal before being compressed and a digital audio signal before being compressed. The reproduced digital video signal and the reproduced digital audio signal are converted into analog video and audio signals, respectively, by the output circuit 514, which will then be outputted from the video/audio output terminal 518. The above-described operations are controlled by the system controller 513.

An example of a general-purpose sequential operation for separating the desired program information in the first packet separating circuit 506 as to the above-described explanation is similar to that as explained with reference to FIG. 2 and FIG. 3. In other words, the first packet separating circuit 506 shown in FIG. 15 corresponds to the first demultiplexer 404 shown in FIG. 1, and is controlled by the system controller 513. The first packet separating circuit 506 executes the process operations defined at the steps 201 to 208 and the step 209 of FIG. 3 to extract a desirable video stream and a desirable audio stream. Then, desired program stream is obtained an supplied to the MPEG2 decoder 507 so as to be decoded. The decoded video signal and the decoded audio signal are processed in the output circuit 514 in order to be converted into analog signals. Then, these analog video/audio signals are outputted from the video/audio output terminal 58 so as to be received by an external television set (not shown), so that the program desired by the observer can be displayed.

Next, a description will now be made of a sequential operation for recording the signal received via the second packet separating circuit 509 by the recording/ reproducing apparatus 512, and also for reproducing the signal recorded on the recording/reproducing apparatus 512.

The second packet separating circuit 509 corresponds to a means for extracting data which is required when the observer reproduces only this desired program during the reproducing operation after being recorded. During the reproducing operation, since a packet is needed in addition to the signals extracted by the first packet separating circuit 506, another stream different from the program stream is required. In the ninth embodiment of FIG. 15, in addition to the respective packets such as the above-described PAT, PMT, video data and audio data, both a PCR (Program Clock Reference) equal to data indicative of time information required in the MPEG2 decoder 507, and information related to a desired program (namely, program presently observed by observer) among the program related information are extracted, and thereafter are recorded on the recording/reproducing apparatus 512 via the packet replacing circuit 510 and the interface circuit 511.

One embodiment of the present invention contemplates that when the signal is reproduced by the recording/ reproducing apparatus 512, the program of the recorded signal is automatically selected. To achieve the contemplation, after the above-described PAT replacement is carried out in the packet replacing circuit 510, the packet-replaced signal is recorded.

Figure 16:
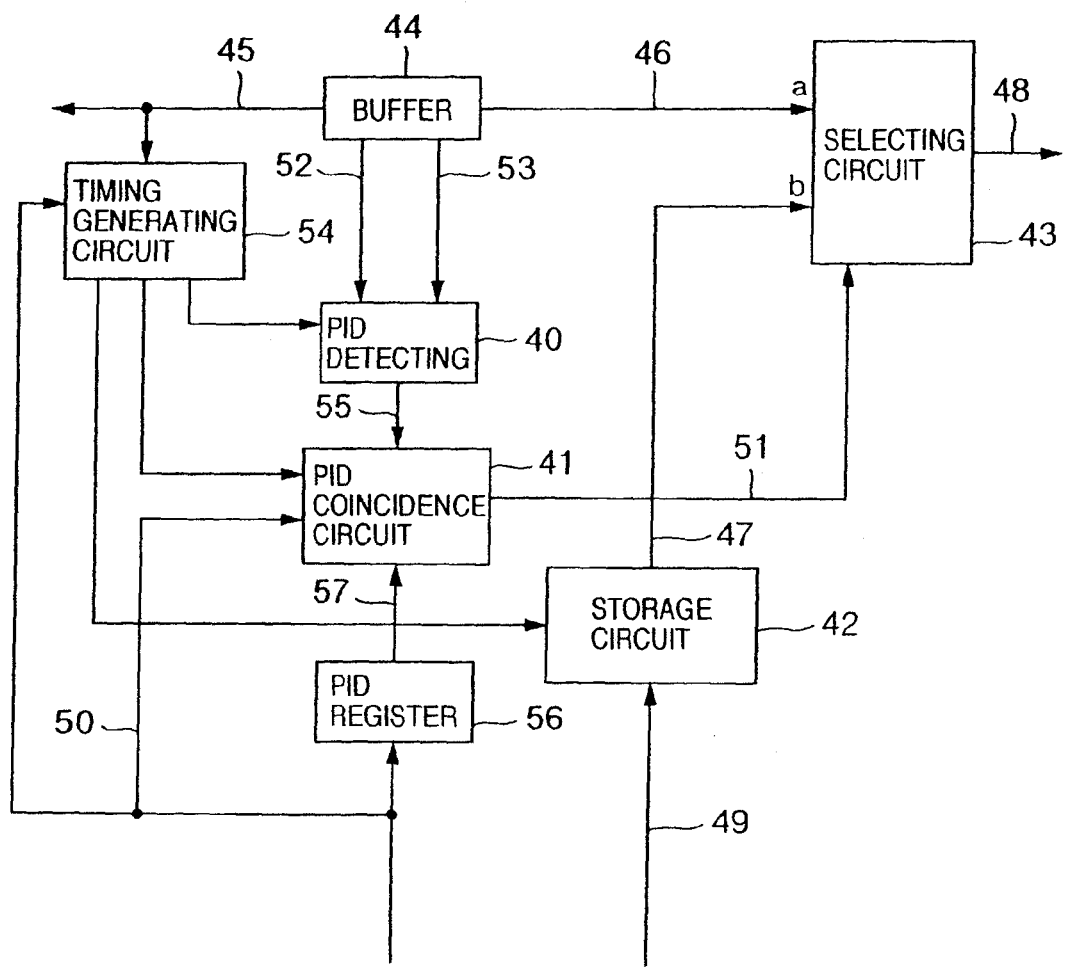
FIG. 16 is a schematic block diagram for showing a first arrangement of the present replacing circuit shown in FIG. 15.

Operations of the packet replacing circuit 510 will now be described as follows:

FIG. 16 represents a first structural example of the packet replacing circuit. In FIG. 16, reference numeral 44 shows a buffer for temporarily storing therein data having approximately several bytes, reference numeral 40 indicates a PID detecting circuit for detecting a PID 27 from the data stored in the buffer 44, reference numeral 41 shows a PID coincidence circuit for comparing the PID detected by the PID detecting circuit 40 with a preselected value, reference numeral 42 is a storage circuit for storing the replaced data, and reference numeral 46 shows a selecting circuit for selecting the inputted data output from the buffer 44, or the data outputted from the storage circuit 42. Also, reference numeral 54 is a timing generating circuit, and reference numeral 56 represents a PID register for storing therein a predetermined PID entered by the system controller 13.

Figure 17:
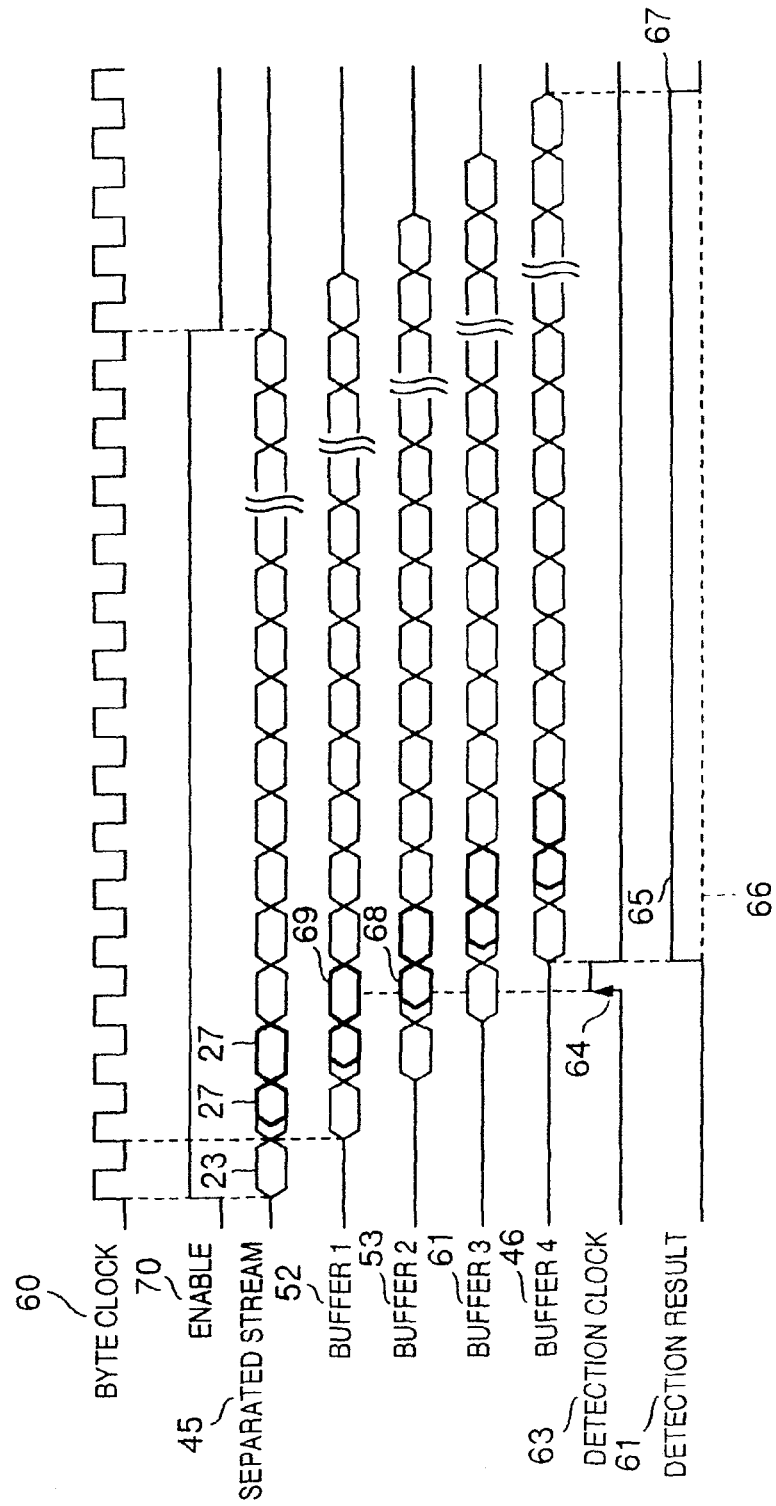
FIG. 17 is a timing chart for indicating operations of the packet replacing circuit shown in FIG. 10 16.

FIG. 17 indicates an operation timing chart of the packet replacing circuit. It is now assumed that this packet replacing circuit is operated in unit of a byte, and all of a input packet 45 and the like are 8-bit parallel signals. Although not shown in FIG. 16, the packet replacing circuit is operated in synchronism with a byte clock 60 indicated in FIG. 17.

A separated stream 45 outputted from the second packet separating circuit 509 is sequentially stored in the buffer 44 in unit of several bytes. In FIG. 17, the data stored in the buffer 44 with respect to each of stages are set as a buffer 1(52), a buffer 2(53), a buffer 3(61), and a buffer 4(46). Also, an enable signal 70 representative of a section of an input packet is indicated in FIG. 17. Alternatively, the enable signal 70 may be outputted from the second packet separating circuit 509, or may be generated by the timing generating circuit 54 from the synchronization byte 23.

A PID of a packet to be replaced (replaced PID) is previously inputted by the system controller 513, and then is stored into the PID register 56, and data after being replaced (replaced data) is entered via the system controller 513 to be stored into the storage circuit 42. It should also be noted that a plurality of packet data may be stored into the storage circuit 42.

A detection clock 63 is generated from the enable signal 70 by the timing generating circuit 54. At timing 64, a total of 13 bits, namely an 8-bit output of the buffer 1 and a lower-digit 5 bits of the buffer 2 becomes a PID 27. The PID coincidence circuit 41 compares a detected PID 55 which is detected by the PID detecting circuit 40 with a replaced PID 57 which is stored into the PID register 56. When the detected PID 55 is made coincident with the replaced PID 57, a detection result 51 is set to "H" as indicated by 65. Conversely, when the detected PID 55 is not made coincident with the placed PID 57, the detection result 51 remains as "L" as indicated by a broken line of 66. When the detection result 51 is equal to "L", the selecting circuit 46 selects "a", whereas when the detection result 51 is equal to "H", the selecting circuit 46 selects "b", so that if the detected PID 55 is made coincident with the replaced PID 57, this selecting circuit 46 outputs replaced data 47 corresponding to the output from the storage circuit 42. As a result, all of the packets having a preselected PID can be replaced by arbitrary data. The output timing of the storage circuit 42 is controlled by the timing generating circuit 54. When the detected PID 55 is not made coincident with the replaced PID 57, the output 46 from the buffer 44 is directly outputted.

As a consequence, such a PAT into which the PIDs of a plurality of PMT packets are written with respect to a plurality of programs multiplexed on a single input stream 80 can be replaced by such a PAT into which the PIDs of the PMT packets only for the presently recorded programs are written. In other words, the PIDs of the PATs are stored into the PID register under control of the system controller 513, and also the PAT only for the PIDs of the PMT packets only for the program to be recorded may be stored into the storage circuit 42.

Figure 18:
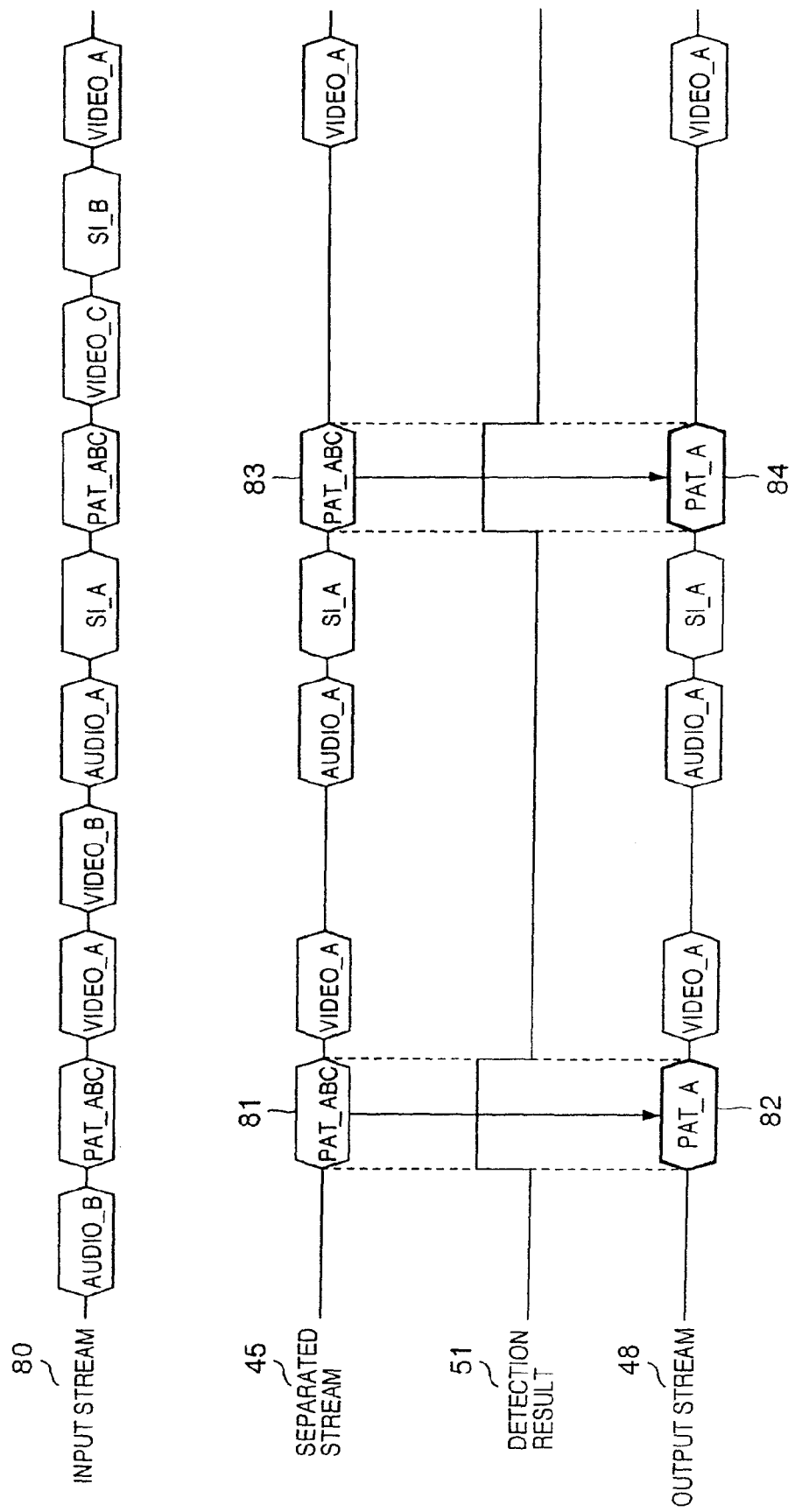
FIG. 18 is a timing chart for representing conditions of separating/replacing packets.

FIG. 18 is a timing chart for indicating operation examples of the packet separating operation and the packet replacing operation. In the figure, reference numeral 80 shows an input stream to be entered into the second packet separating circuit 9, reference numeral 45 indicates a separated stream generated by separating only the packet related to one program by the second packet separating circuit 509, reference numeral 48 shows an output stream corresponding to the output from the packet replacing circuit 510. It should be understood that in FIG. 18, symbols "A", "B", and "C" indicate packets related to a program A, a program B, and a program C, respectively and another symbol "ST" denotes a packed other than the audio packet.

Both the packet and the PAT related to the program A are extracted from the input stream 80 by the packet separating circuit 509 to thereby obtain the separated stream 45. Since the PIDs of the PMTs for all of the programs A, B, C are written into the PATs (81, 83) at this time, the packet replacing circuit 510 replaces the PATs (82, 84) only for the PID of the PMT for the program A by way of the above-explained operations, so that the output stream 48 is outputted. This output stream 48 is processed by, for instance, a parallel-to-serial conversion in the interface circuit 511, and then the parallel/serial-converted output stream is supplied to the recording/reproducing apparatus 512 so as to be recorded.

During the reproducing operation, the signal reproduced by the recording/reproducing apparatus 512 is serial-to-parallel-converted by the interface circuit 511 into a serial/parallel-converted signal which will then be supplied via the switch 550 to the first packet separating circuit 506. When the signal recorded on the recording/reproducing apparatus 512 is reproduced by the first packet separating circuit 506, the first packet separating circuit 506 is controlled by the system controller 513 to be operated in accordance with the same sequential operation as explained in FIG. 4 with respect to the arrangement of FIG. 1.

Figure 19:
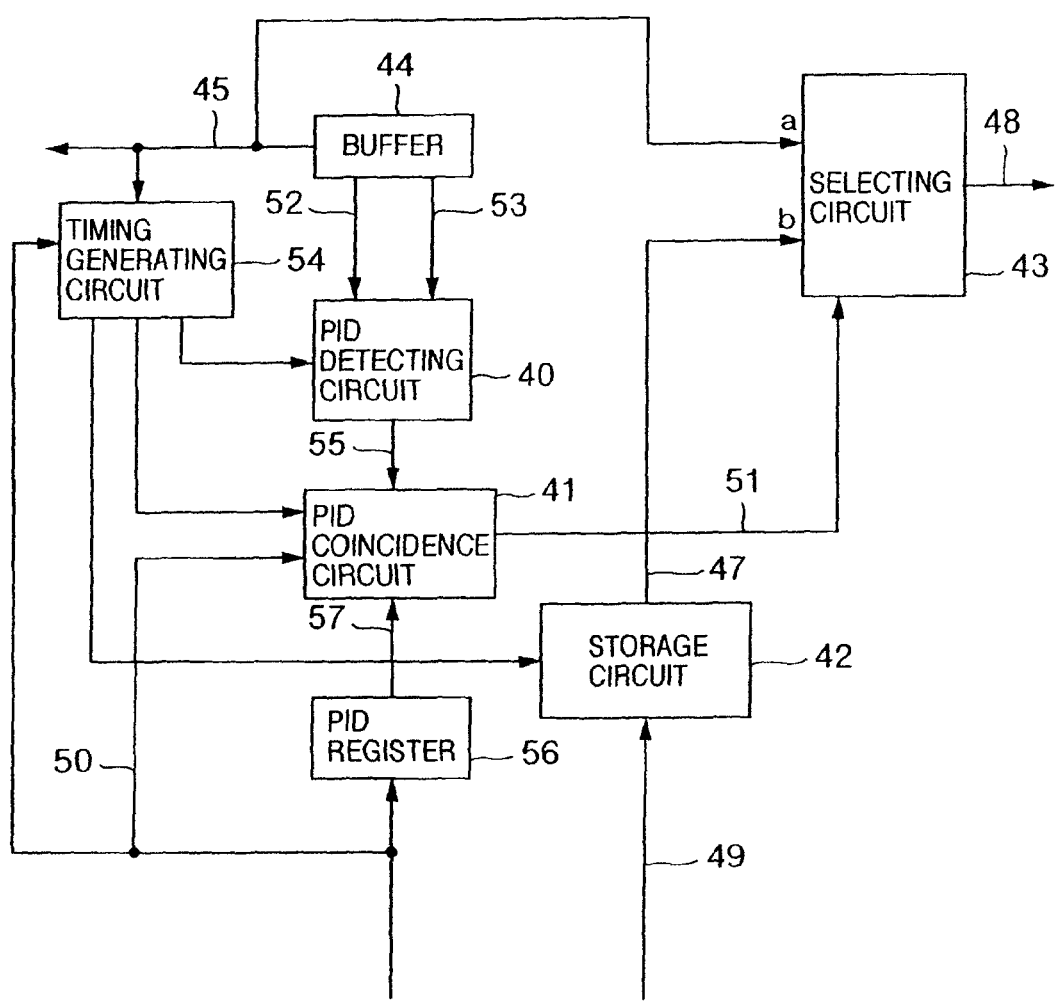
FIG. 19 is a schematic block diagram for showing a second arrangement of the present replacing circuit shown in FIG. 15.

In the above-mentioned descriptions, the packet replacing circuit 510 replaces the entire packet. Alternatively, when the PAT is replaced, the header 20 is directly reserved, and only the portion of the data 21 is replaced. As a result, the replacing timing may be set immediately after the header 20. In this alternative case, an arrangement of the replacing circuit 510 is shown in FIG. 19, and operation timing thereof is indicated in FIG. 20. In FIG. 19, an input "a" of the selecting circuit 43 is used as a separated stream 45 before the buffer 44. The timing of the detection clock 63 shown in FIG. 20, and the timing at which the detection result 51 becomes "H" are identical to those of FIG. 5. The input "a" of the selecting circuit 43 corresponds to such a time instant when the header 20 is ended, and only the data 21 is replaced. With this arrangement, the storage capacitance of the buffer 44 can be reduced, and the circuit scale can be reduced.

Also, in FIG. 17 and FIG. 20, the timing 67 at which the detection result 51 is returned to "L" is set to the timing after the final data of the packet has been outputted. Alternatively, this return timing 67 may be switched in a half way of the packet. As a consequence, only the data about a portion of the data 21 may be replaced.

Alternatively, when the packet replacing circuit 510 is equipped with a mode capable of replacing all packets into replaced data, an arbitrary packet may be recorded on the recording/reproducing apparatus 512 at arbitrary timing. An operation sample of the alternative case is indicated in FIG. 21. In FIG. 21, reference numeral 50 shows an operation mode of the packet replacing circuit 510 controlled by the system controller 513. A "PAT" replacement is a mode in which the above-described normal packet replacing operation is carried out. An "all replacement mode-I" is such a mode that all of separated streams entered into the packet replacing circuit 510 are replaced by the first replaced data stored in the storage circuit 42 irrelevant to the PIDs thereof, and the first replacement data may be different from the replaced data replaced in the PAT replacement mode. Also, an "all replacement mode-2" is such a mode that all of separated streams entered into this packet replacing circuit 510 are similarly replaced by the second replaced data stored in the storage circuit 42 irrelevant to the PIDs thereof. In the all replacement mode, the PID coincidence circuit 41 may set the detection result 51 to "H" irrelevant to the values of the detected PID 55 and the replaced PID 57. As represented by an output stream of FIG. 21, an arbitrary packet, PA1 (93 and 94), and PA2 (95) can be recorded under control of the replacement mode 50 by the system controller 513. The selection between the PA1 and the PA2 may be made by that the replacement mode 50 is judged by the timing generating circuit 54 to control the storage circuit 42. Specifically speaking, when a RAM is employed in the storage circuit 42, the read addresses of this RAM may be selected.

As a result, for example, when the recording operation is started and the recording operation is ended, a packet and the like, which indicate an interruption of the recording operation, can be recorded. Since the editing point of the recording operation and the changing point of the program can be detected during the reproducing operation, either the automatic resetting operation can be done, on the program can be changed by the first packet separating means 506.

On the other hand, in the case where the time duration for the all replacement mode is short, there is no guarantee that a packet is present in the separated stream 45. Accordingly, the separating operation by the second packet separating circuit 509 is controlled, so that all of the packets may pass through during the all replacement mode.

FIG. 22 shows operation timing in this case. That is, an all packet through mode is introduced into the second packet separating circuit 509 under control of the system controller 513. In the Figure, reference numeral 100 shows a separation mode, and when this separation mode is "L", the normal separating operation is carried out, whereas when this separation mode is "H", the all packet through mode becomes effective.

When the second packet separating circuit 509 is operated in an all packet output mode between the all replacement mode −1 and the all replacement mode −2, all of the packets 101 to 105 are entered into the packet replacing circuit 10 on the separated stream. As a consequence, the PA1 (106, 107, 108) and the PA2 (109, 110) can be surely recorded on the recording/reproducing apparatus 12.

It should also be noted that although the interface circuit 511 is connected to the recording/reproducing apparatus 512 with the input/output common mode in FIG. 15, the input and the output may be separated from each other. Also, the above-described embodiments employ the data serial transfer operation but may employ the data parallel transfer operation. In this alternative case, the parallel-to-serial converting operation by the interface circuit 511 is no longer required. Also, the first packet separating circuit 506 is separately provided with the second packet separating circuit 509 in the above-described embodiments. Alternatively, these two packet separating circuits may be combined within a single circuit arrangement.

Furthermore, the signals are explained as the 8-bit parallel signals with reference to the operations shown in FIG. 16 and FIG. 19. Alternatively, for instance, these signals may be processed as 16-bit parallel signals, or 1-bit serial signals.

It should also be understood that FIG. 18, FIG. 21, and FIG. 22 represent that the input stream 80, the separated stream 45, and the output stream 48 appear at the same timing. However, practically speaking, since various signal processing operations are carried out, certain delays on the order of several bytes to several packets are generated among these streams. In this embodiment, these delays are neglected.

Although the above-described packet replacing circuit 510 replaces the PAT, the packet replacing circuit 510 may replace the header 20 of another packet, and the data 21.

Also, there are possibilities that the values of the 4 bits of the continuity counter 30 contained in the header 20 must be changed every packet. In this case, the continuity counter 30 or the 8-bit (1 byte) data containing the continuity counter 30 stored in the storage circuit 42 may be replaced under control of the system controller 513 every time the packet is replaced. To this end, although not shown in FIG. 16, the detection result 51 is entered into the system controller 513, so that such a recognition may be made of the packet replacement.

Furthermore, the error checking CRC code is added to the data 21 of the actual packet. The CRC code of the replaced data may be calculated by the system controller 513. Alternatively, a CRC code generating circuit (not shown) may be employed in the packet replacing circuit 510, so that the CRC code may be generated, or added.

Also, in the above-described embodiments, the packet replacing circuit 510 exclusively used to replace the packet is employed. Alternatively, the packet may be replaced within the block of the first packet separating circuit 509. Furthermore, the packet may be replaced at the same time when the packet is separated, or before the packet is separated. Also, the respective packets are once acquired into the system controller 513, and then may be replaced by this system controller 513. When the packet is replaced by the system controller 513, the work load thereof is increased. Therefore, although a high-speed CPU is required, there is an advantage that the packet replacing operation can be performed with flexibility.

In the above description, the PID 27 contained in the header 20 is used so as to judge whether or not the packet replacing operation is carried out. Alternatively, other data contained in the header 20, or the specific data contained in the data 21 may be employed for this judgment purpose.

It should also be understood that although the buffer 44, the storage circuit 44, and the PID register 56 are employed as the separate circuits in FIG. 16 and FIG. 19, these circuits may be commonly employed by either one storage circuit or two storage circuits.

As previously explained in detail, in accordance with the present invention, even when the information amount of the signals to be transmitted is different from the information amount recordable in the recording/ reproducing apparatus, only the digital signal related to a desired program can be selectively recorded. Also, the recorded program can be immediately reproduced without any complex operation during the reproducing operation.

What is claimed is:

1. A digital broadcasting information receiving apparatus comprising:
   a receiving circuit receiving transmitted digital information and demodulating the received digital information into a bit stream having a predetermined packet structure, said transmitted digital information being such that a plurality of logical channel signals of at least one of video, audio, and data are multiplexed as digital information on a single bit stream having a predetermined packet format defined in MPEG-2 rule and are transmitted;
   a packet separating circuit extracting a designated packet from a bit stream output from an input processing circuit;
   a packet replacing circuit replacing at least packet IDs of the packet output from said packet separating circuit with predetermined information;
   an output circuit outputting an output signal from said packet replacing circuit; and
   a control circuit controlling operations of said packet separating circuit,
   wherein said packet replacing circuit includes:
      a temporary storage circuit temporarily storing an input signal;
      a detecting circuit detecting a specific signal from the signal temporarily stored in said temporary storage circuit;
      first storage circuit and second storage circuit storing a signal entered from said control circuit;
      a comparing circuit comparing the signal detected by said detecting circuit with the signal stored in said storage circuit; and
      a selecting circuit selecting said input signal, the signal temporarily stored in said temporary storage circuit, or the signal stored in said second storage circuit,
   wherein when said specific signal is a predetermined value, either a portion or all of the packets containing said specific signal are replaced by the signal stored in said second storage circuit, and
   wherein said selecting circuit selects said input signal, the signal temporarily stored in said temporary storage circuit, or the signal stored in said second storage circuit under control of said comparing circuit and said control circuit, and owns a first mode in which, when said specific signal is equal to a predetermined value, either a portion or all of the packets containing said specific signal is replaced by the signal stored in said second storage circuit, and also owns a second mode in which either a portion or all of the packets containing said specific signal is replaced by the signal stored in said second storage circuit irrelevant to the value of said specific signal under control of said control circuit.

2. The digital broadcasting signal receiving apparatus as claimed in claim 1, wherein said second storage circuit stores therein plural sorts of signals, and comprises output control circuit controlling the output derived from said second storage circuit under control of said control circuit, and
   wherein a packet signal replaced by said packet replacing circuit can be selected by said control circuit.

3. A digital broadcasting information receiving apparatus comprising:
   a receiving circuit receiving transmitted digital information and demodulating the received digital information into a bit stream having a predetermined packet structure, said transmitted digital information being such that a plurality of logical channel signals of at least one of video, audio, and data are multiplexed as digital information on a single bit stream having a predetermined packet format defined in MPEG-2 rule and are transmitted;
   a packet separating circuit extracting a designated packet from a bit stream output from an input processing circuit;
   a packet replacing circuit replacing at least packed IDs of the packets output from said packet separating circuit with predetermined information;
   an output circuit outputting an output signal from said packet replacing circuit; and
   a control circuit controlling operations of said packet separating circuit, wherein said packet replacing circuit includes a storage circuit storing therein a signal entered from said control circuit and a selecting circuit selecting said input signal, or the signal stored in said storage circuit under control of said control circuit wherein said packet separating circuit replaces a portion, or all of packets by the signal stored in said storage circuit under control of said control circuit, and wherein said separating circuit owns a normal mode for extracting a designated packet, and a through mode for extracting all of the packets.

4. A method of receiving digital broadcasting information comprising the steps of:

receiving transmitted digital information and demodulating the received digital information into a bit stream having a predetermined packet structure, said transmitted digital information being such that a plurality of logical channel signals of at least one of video, audio and data are multiplexed as digital information on a single bit stream having a predetermined packet format defined in MPEG-2 rule and are transmitted;

extracting a designated packet from a bit stream output from an input processing circuit;

replacing at least packet IDs of the packet output from said extracting step with predetermined information;

outputting an output signal from said replacing step; and controlling said extracting step, wherein said replacing step comprises the steps of:

temporarily storing an input signal;

detecting a specific signal from the temporarily stored signal;

storing a signal from said controlling step;

comparing the signal detected by said detection step with the signal stored from said controlling step; and selecting said input signal, the temporarily stored signal, or the signal stored from said controlling step, wherein when said specific signal is a predetermined value, either a portion or all of the packets containing said specific signal are replaced by the signal stored from said controlling step, and wherein said selecting step selects said input signal, the temporarily stored signal, or the stored signal from said controlling step under control of said comparing step and said controlling step, and provides a first mode in which, when said specific signal is equal to a predetermined value, either a portion or all of the packets containing said specific signal is replaced by the signal stored in said second storage circuit, and also provides a second mode in which either a portion or all of the packets containing said specific signal is replaced by the stored signal from said controlling step irrelevant of the value of said specific signal under control of said controlling step.

5. The method as claimed in claim 4, wherein said storing of the signal from said controlling step includes storing plural sorts of signals, and controlling the output of the stored signal from said controlling step under control of said controlling step, and wherein a packet signal replaced by said replacing step can be selected by said controlling step.

6. A method of receiving digital broadcasting information comprising the steps of:

receiving transmitted digital information and demodulating the received digital information into a bit stream having a predetermined packet structure, said transmitted digital information being such that a plurality of logical channel signals of at least one of video, audio, and data are multiplexed as digital information on a single bit stream having a predetermined packet format defined in MPEG-2 rule and are transmitted;

extracting a designated packet from a bit stream output from an input processing circuit;

replacing at least packed IDs of the packets output from said extracting step with predetermined information;

outputting an output signal from said replacing step; and controlling said extracting step, wherein said replacing step comprises the steps of:

storing a signal entered from said controlling step:

selecting said input signal, or the stored signal entered from said controlling step; and replacing a portion, or all of packets by the stored signal entered from said control step, wherein said extracting step provides a normal mode for extracting a designated packet, and a through mode for extracting all of the packets.

* * * * *